United States Patent [19]
Kawaguchi et al.

[11] Patent Number: 5,278,981
[45] Date of Patent: * Jan. 11, 1994

[54] CHARACTER STREAM SEARCH APPARATUS USING A FINITE STATE AUTOMATION

[75] Inventors: Hisamitsu Kawaguchi, Hachioji; Kanji Kato; Hiromichi Fujisawa, both of Tokorozawa; Masaaki Fujinawa, Tokyo; Atsushi Hatakeyama, Kokubunji, all of Japan

[73] Assignee: Hitachi, Ltd., Tokyo, Japan

[*] Notice: The portion of the term of this patent subsequent to Sep. 24, 2008 has been disclaimed.

[21] Appl. No.: 761,442

[22] Filed: Sep. 18, 1991

Related U.S. Application Data

[62] Division of Ser. No. 205,923, Jun. 13, 1988, Pat. No. 5,051,886.

[30] Foreign Application Priority Data

Jun. 15, 1987 [JP] Japan .................. 62-147041

[51] Int. Cl.$^5$ .......................... G06F 7/22; G06F 7/06
[52] U.S. Cl. ........................ 395/600; 395/575; 364/253.1; 364/259.1; 364/947.2; 364/955.5; 364/956.1; 364/963.3
[58] Field of Search ........................ 395/425, 600, 575; 364/200

[56] References Cited

U.S. PATENT DOCUMENTS

3,568,156  3/1971  Thompson.
4,241,402  12/1980 Mayper, Jr. et al. .
4,285,049  8/1981  Bird .
4,450,520  5/1984  Hollaar et al. .
4,764,863  8/1988  Silverthorm, III et al. .
4,985,863  1/1991  Fujisawa et al. .

OTHER PUBLICATIONS

Johnson et al; "Automatic Generation of Efficient Lexical Processor Using Fimite State Technique", Communication of the ACM, vol. 11, No. 12, Dec. 1968; 805–812.
Hopcroft et al.; "Introduction to Automata Theory, Languages, and Computer"; Addison-Wesley Publishing Company; pp. 16–24, 1979.
Aho et al; "Efficient String Matching: An Aid to Bibliographic Search"; Communication of the ACM, vol. 18, No. 6, Jun. 1975, pp. 333–340.

Primary Examiner—Parshotam S. Lall
Assistant Examiner—Krisna Lim
Attorney, Agent, or Firm—Antonelli, Terry, Stout & Kraus

[57] ABSTRACT

A character stream search system using an FSA for determining at a time whether or not a plurality of character streams as search objects exist in a search character stream which undergoes a search operation and which comprises a plurality of characters expressed with codes. In the system, a collation is conducted between the search character stream and a search object character. In a case where there exists a matched search object character as a result of the collation, a state transition is carried out to a predetermined state indicated by the FSA. In a case where there does not exist a matched search object character, a failure processing to effect a state transition to a transition destination which is determined in association with the configuration of the FSA. The failure processing is completed at a count which is a predetermined upper-limit value for each character undergone the search operation.

6 Claims, 24 Drawing Sheets

| STATE NUMBER | 1 | 2 | 3 | 4 | 5 | 6 | 7 | 8 | 9 | 10 | 11 | 12 |
|---|---|---|---|---|---|---|---|---|---|---|---|---|
| STATE NUMBER EFFECTED BY FAILURE | 0 | 0 | 0 | 0 | 1 | 2 | 0 | 0 | 4 | 5 | 6 | 0 |

| STATE NUMBER | 1 | 2 | 3 | 4 | 5 | 6 | 7 | 8 | 9 | 10 | 11 | 12 |
|---|---|---|---|---|---|---|---|---|---|---|---|---|
| STATE NUMBER EFFECTED BY FAILURE | 0 | 0 | 0 | 0 | 0 | 0 | 0 | 0 | 4 | 5 | 6 | 0 |

| STATE NUMBER | 1 | 2 | 3 | 4 | 5 | 6 | 7 | 8 | 9 | 10 | 11 | 12 |
|---|---|---|---|---|---|---|---|---|---|---|---|---|
| STATE NUMBER EFFECTED BY FAILURE | 0 | 0 | 0 | 0 | 1 | 2 | 0 | 0 | 4 | 1 | 2 | 0 |

FIG. 12

| CHARACTER / CHARACTER CODE \ STATE NUMBER | 0 | 1 | ... | 10 | ... | 65 | 66 | ... | 187 | 188 | 189 | 190 | ... | 207 | ... | 226 S | ... | 240 0 | ... | 246 6 | ... | 254 | 255 |
|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 6 | 0 | 0 | 0 | 0 | 0 | 0 | 0 |
| 2 | 0 | 0 | 0 | 0 | 0 | 0 | 4 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 4 | 5 | 5 | 5 | 3 | 5 | 5 | 5 | 5 | 5 | 5 | 5 | 9 | 5 | 5 | 5 | 5 | 5 | 5 | 5 | 5 | 5 | 5 | 5 |
| 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 6 | 0 | 0 | 0 | 0 | 0 | 0 | 0 | 0 | 0 | 0 | 0 | 0 | 0 | 0 | 0 | 0 | 0 | 0 | 0 | 7 | 0 | 0 | 0 |
| 7 | 0 | 0 | 0 | 0 | 0 | 0 | 0 | 0 | 0 | 0 | 0 | 0 | 0 | 0 | 0 | 0 | 0 | 8 | 0 | 0 | 0 | 0 | 0 |
| 8 | 0 | 0 | 0 | 0 | 0 | 0 | 0 | 0 | 0 | 0 | 10 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 12 | 0 | 0 | 0 | 11 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 13 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 14 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 13

| STATE NUMBER | STATE NUMBER EFFECTED BY FAILURE |
|---|---|
| 1 | |
| 2 | 1 |
| 3 | 1 |
| 4 | 4 |
| 5 | 4 |
| 6 | 5 |
| 7 | 1 |
| 8 | 1 |
| 9 | 1 |
| 10 | 5 |
| 11 | 4 |
| 12 | 5 |
| 13 | 4 |
| 14 | 5 |
| | 4 |

FIG. 14

| STATE NUMBER | SEARCH TERM NUMBER |
|---|---|
| 1 | 0 |
| 2 | 0 |
| 3 | 0 |
| 4 | 0 |
| 5 | 0 |
| 6 | 0 |
| 7 | 0 |
| 8 | 1 |
| 9 | 0 |
| 10 | 0 |
| 11 | 0 |
| 12 | 0 |
| 13 | 0 |
| 14 | 2 |

FIG. 21

| CHARACTER<br>CHARACTER CODE<br>STATE NUMBER | 0 | 1 | ... | A 193 | B 194 | C 195 | D 196 | ... | X 231 | Y 232 | Z 233 | ... | 254 | 255 |
|---|---|---|---|---|---|---|---|---|---|---|---|---|---|---|
| 0 | 0 | 0 | 0 | 1 | 0 | 4 | 8 | 0 | 0 | 0 | 0 | 0 | 0 | 0 |
| 1 | 0 | 0 | 0 | 0 | 2 | 0 | 0 | 0 | 0 | 0 | 0 | 0 | 0 | 0 |
| 2 | 0 | 0 | 0 | 0 | 0 | 0 | 0 | 0 | 3 | 0 | 0 | 0 | 0 | 0 |
| 3 | 0 | 0 | 0 | 0 | 0 | 0 | 0 | 0 | 0 | 0 | 0 | 0 | 0 | 0 |
| 4 | 0 | 0 | 0 | 5 | 0 | 0 | 0 | 0 | 0 | 0 | 0 | 0 | 0 | 0 |
| 5 | 0 | 0 | 0 | 0 | 6 | 0 | 0 | 0 | 3 | 0 | 0 | 0 | 0 | 0 |
| 6 | 0 | 0 | 0 | 0 | 0 | 0 | 0 | 0 | 0 | 7 | 0 | 0 | 0 | 0 |
| 7 | 0 | 0 | 0 | 0 | 0 | 0 | 0 | 0 | 0 | 0 | 0 | 0 | 0 | 0 |
| 8 | 0 | 0 | 0 | 0 | 0 | 9 | 0 | 0 | 0 | 0 | 0 | 0 | 0 | 0 |
| 9 | 0 | 0 | 0 | 10 | 0 | 0 | 0 | 0 | 0 | 0 | 0 | 0 | 0 | 0 |
| 10 | 0 | 0 | 0 | 0 | 11 | 0 | 0 | 0 | 3 | 7 | 12 | 0 | 0 | 0 |
| 11 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 |

FIG. 26

| CHARACTER | 0 | | | ; | | , | | F | | S | | 0 | 1 | | 6 | | | |
|---|---|---|---|---|---|---|---|---|---|---|---|---|---|---|---|---|---|---|
| CHARACTER CODE | 0 | 1 | ... | 94 | ... | 107 | ... | 198 | ... | 226 | ... | 240 | 241 | ... | 246 | ... | 254 | 255 |
| STATE NUMBER | | | | | | | | | | | | | | | | | | |
| 1 | 1 | 1 | 1 | 2 | 1 | 1 | 1 | 11 | 1 | 1 | 1 | 1 | 1 | 1 | 1 | 1 | 1 | 0 |
| 2 | 2 | 2 | 2 | 3 | 2 | 2 | 2 | 2 | 2 | 21 | 2 | 2 | 2 | 2 | 2 | 2 | 2 | 0 |
| 11 | 0 | 0 | 0 | 0 | 0 | 0 | 0 | 0 | 0 | 0 | 0 | 12 | 0 | 0 | 0 | 0 | 0 | 0 |
| 12 | 0 | 0 | 0 | 0 | 0 | 0 | 0 | 0 | 0 | 0 | 0 | 13 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 22 | 0 | 0 | 0 |
| 22 | 0 | 0 | 0 | 0 | 0 | 0 | 0 | 0 | 0 | 0 | 0 | 23 | 0 | 0 | 0 | 0 | 0 | 0 |
| 23 | 0 | 0 | 0 | 0 | 0 | 0 | 0 | 0 | 0 | 0 | 0 | 0 | 0 | 0 | 0 | 0 | 0 | 0 |

FIG. 27

| CHARACTER | | | | ; | | , | | | F | | S | | | O | 1 | | 6 | | | | |
|---|---|---|---|---|---|---|---|---|---|---|---|---|---|---|---|---|---|---|---|---|---|
| CHARACTER CODE | 0 | 1 | ... | 94 | ... | 107 | ... | 198 | ... | 226 | ... | 240 | 241 | ... | 246 | ... | 254 | 255 |
| | 1 | 1 | 1 | 2 | 1 | 1 | 1 | 1 | 1 | 1 | 1 | 1 | 1 | 1 | 1 | 1 | 1 | 1 | 0 |
| STATE NUMBER | 2 | 2 | 2 | 3 | 2 | 2 | 2 | 2 | 2 | 21 | 2 | 2 | 2 | 2 | 2 | 2 | 2 | 2 | 0 |

FIG. 28

| STATE NUMBER | AUXILIARY STATE NUMBER |
|---|---|
| 0 | 0 |
| 1 | 0 |
| 2 | 0 |
| 3 | 0 |
| 4 | 0 |
| 5 | 5 |
| 6 | 6 |

FIG. 30

| CURRENT STATE NUMBER | CHARAC- TER | CHARACTER CODE | TRANSMIT STATE NUMBER |
|---|---|---|---|
| 0 | A | 193 | 1 |
| 0 | C | 195 | 4 |
| 0 | D | 196 | 8 |
| 1 | B | 194 | 2 |
| 2 | X | 231 | 3 |
| 4 | A | 193 | 5 |
| 5 | B | 194 | 6 |
| 6 | X | 231 | 3 |
| 6 | Y | 232 | 7 |
| 8 | C | 195 | 9 |
| 9 | A | 193 | 10 |
| 10 | B | 194 | 11 |
| 11 | X | 231 | 3 |
| 11 | Y | 232 | 7 |
| 11 | Z | 233 | 12 |

CHARACTER STREAM SEARCH APPARATUS USING A FINITE STATE AUTOMATION

This application is a divisional of application Ser. No. 205,923, filed Jun. 13, 1988, now U.S. Pat. No. 5,051,886, issued on Sep. 24, 1991.

BACKGROUND OF THE INVENTION

The present invention relates to an information processing system, and in particular, to a retrieval or search method in an information search system for judging at a time whether or not a set of a plurality of character streams exists in character streams undergoing a search operation. The present invention is applicable to a search operation in a data base, a document filing system, a word processor, and the like.

In recent years, there has been increased the importance of a large-sized data base service including not only the secondary information (bibliographic information) but also the primary information (text) of, for example, literature information and patent information. For the information retrieval or search PROCESSING in such a data base, there has been conventionally adopted a method utilizing a key word and a classification code. According to this method, however, the range of the search operation can only be limited to several tens of items or several hundred items; consequently, there remains a problem with respect to the processing efficiency that the operator of the search operation is required to directly read the text at the final stage for the confirmation of the content. In addition, since the classified items are also changed with a lapse of time, there arises a problem that key words and classification codes must be appropriately updated. Furthermore, when registering a new document, because the operation to assign the key words (called an indexing operation) thereto takes a considerable period of time, a batch processing is effected for the registration of a considerable volume of data. As a result, there arises a problem of delay associated with the information search operation in that a certain period of time is required before the information of the document can be searched in the system.

As a method to cope with these problems, there has been considered an entire or overall text search system in which the operator can search the content of the text of a document by directly referencing the text based on an arbitrary key word or a free key word.

Particularly, in a case where a search operation is carried out by use of an arbitrary key word (free key word operation), terms with the different notations and synonymous terms are employed in many cases depending on the personal habit of the operator. For example, the codes of a long vowel ( ⏤ ) and ( — ) are used as " デーダ " (DATA) and " デーﾀ " (DATA), the code of the long vowel are present and absent in a term as "インタ−フェイス" (INTERFACE) and "インタフェイス" (INTERFACE), and a word with a difficult pronunciation is expressed as "インタ−フェイス" (INTERFACE) and " ｲﾝﾀﾌｴｲｽ" (INTERFACE).

In addition, as an example of synonymous words for a computer, there are used " 電算機 " (KEISANKI), "計算機" (DENSANKI) and " コンピュータ "(COMPUTER). For a term, several tens of kinds of such words or terms including those represented in the different notations and the synonymous words may be considered in some cases. In consequence, when a key word is specified with a plurality of free words, several hundreds of words including those in the different notations and the synonyms are to be generated.

As described above, in order to effect a search operation by use of a free word, there is required means for achieving at a high speed a search operation for many key words including synonyms and words expressed in the different notations.

On the other hand, there have been proposed several character stream searching apparatuses suitable for such an overall or entire text search system. With reference to FIG. 1 showing a representative constitution of the apparatus, a description will be given of the content thereof.

In a character stream search apparatus 1, a search controller 101 controls the overall search apparatus and achieves communications with a host computer. That is, the search controller 101 receives a search request 201 sent from the host computer, analyzes the search request 201, and then delivers the analyzed request 201 as search information 202 to a term comparator 200 and a query resolver 103. In addition, the search controller 101 controls a disk controller 104 so as to transmit character stream data 204 stored in a search data base 105 to the term comparator 200.

The term comparator 200 achieves a check to determine whether or not there exists a data item input character data 204 which matches with the search request. If this is the case, the term comparator 200 outputs information 205 identifying the character stream to the query resolver 103, which in turn checks the data, based on the pertinent character stream identification information 205, to determine whether or not a complex condition including a positional interrelationship specified in the search request is satisfied. If the complex condition is satisfied, the query resolver 103 supplies the host computer with a search result 206 including pointer information of the pertinent document and text data of the content of the document.

As a collation method of collating character terms in the term comparator 200 as a primary component of the character term search apparatus 1, there has been known a method in which a plurality of character terms are searched through one scanning operation by use of a finite state automaton (FSA). As representative methods, there are two methods as described by A. V. Aho and M. J. Corasick in the "Efficient String Matching", CACM, VOL. 18, No. 6, 1975.

First, referring to FIG. 2, description will be given of the first method (to be referred to as method 1 herebelow). FIG. 2 shows a state transition diagram of an FSA in a case where three character streams including "ABX", "CABY", and "DCABZ" are searched from character stream data. In this diagram, a circle denotes a state of the FSA and an arrow indicates a transition of the FSA state. An alphabet letter assigned to each arrow designates an input character for which the associated state transition takes place. An arrow 403 designates a transition to the initial state. A numeric value marked in each circle stands for a state number of the pertinent state. The characteristic feature of the method 1 resides in that all possible state transitions are represented in the FSA. Consequently, there also exist transitions from the respective states to the state 0; however, in order to avoid the complexity of the diagram, the arrows associated with the transitions to the state 0 from the states other than the state 0 are omitted in this diagram.

Next, the collating operation of the method 1 will be described. The initial state of the FSA is the state 0, namely, the state transition starts from the state 0. For the input characters "A", "C", and "D", the state transition takes place from the state 0 to state 1, state 4, and state 8, respectively. In the state 0, in a case where a character other than "A", "B", and "D" is inputted thereto, the state is returned to the state 0. Similarly, in the state 1, if the input character is "B", "C", and "A", the state is changed to the state 2, state 4, and state 1, respectively. The state 1 is returned to the state 0 if a character other than "B", "C", and "A" is inputted. In the state 2, if the input character is "X", the state is changed to the state 3 which is the end point of the FSA, thereby attaining a character stream "ABX" as the result of the search. For other states, the state transitions are effected in the similar fashion.

As described above, according to the method 1, the state transitions associated with all possible input characters are represented in the FSA. In consequence, the number of state transitions of the FSA is increased and hence there arises a problem that a considerably long period of time is required to generate the FSA. A hardware system in which this method is implemented has been described in the JP-A-60-105039 and JP-A-60-105040.

Next, referring to FIGS. 3 and 4, description will be given of the second method (to be referred to as method 2 herebelow). Like the FSA of FIG. 2, the FSA of FIG. 3 is used to search three character streams including "ABX", "CABY", and "DCABZ" from data comprising character streams. FIG. 4 is an explanatory diagram useful to explain a failure function table indicating transition destinations to be employed in cases where characters other than those included in this FSA are inputted.

Operations will now be described according to the method 2. The initial state of the FSA is state 0. In a case of this example, for the input character "A", "C", and "D", there occur state transitions to the state 1, state 4, and state 8, respectively. When a character other than these letters is inputted, the state is returned to the state 0. On the other hand, for the state 1, if "B" is received as an input character, the state is changed to the state 2. In this situation, when a character other than "B", namely, a character not described in the FSA, for example, "D" is inputted, this condition is called a state failed in this method and hence the failure function table of FIG. 4 is referenced. In the failure function table, there are stored state numbers of failure destinations where a retry is to be effected for the current state number. In this case, a value 0 associated with the failure destination or a state effected by failure is obtained depending on the current state number, and consequently, the state is changed to the state 0. Thereafter, a retry is effected for the input character "D" so as to change the state to the state 8. This provision is called a failure function In the method 2, by adopting the failure function, as shown in FIG. 3, the number of transitions are greatly reduced as compared with the method 1 (FIG. 2). However, the method 2 is attended with the following problem. For example, let us consider a case where a character stream "DCABX" is inputted. In this situation, the state of the FSA undergoes a transition as 0→8→9→10→11→6→2→3 so as to obtain a character stream "ABX" as a search result. In this operation, two transitions from the state 11 to the state 2 are caused by the failure function, that is, the failure function is employed two times for the collate processing of an input character "X". In consequence, according to the method 2 above, the state transition diagram of the FSA is simplified and the period of time to generate the FSA is advantageously minimized; however, the method 2 is attended with a disadvantage that the processing speed is lowered when a failure takes place. In addition, the failure may repeatedly occur a plurality of times for an input character. Consequently, due to the number of failure occurrences, the the number of characters processed in a unit of time is changed As a result, for character streams inputted for search operations at a predetermined constant interval of time, there are required buffers, a synchronization control mechanism, and the like to establish a consistency of the processing speed with respect to the input character streams, which leads to a problem that the control of the apparatus becomes complicated.

SUMMARY OF THE INVENTION

It is therefore an object of the present invention to provide a method for generating at a high speed an FSA to implement a search with a free key word so as to search many key words including synonyms of the key word and equivalent words expressed in the different notations, thereby solving the problems above.

Another object of the present invention is to produce an FSA having a limitation with respect to the failure processing count such that the input speed of character streams from character stream store means is fixed and as a result, a synchronization control mechanism is unnecessitated and the constitution of the input section of the character stream collate means is simplified.

Still another object of the present invention is to complete the overall transition processing including the failure processing in a cycle so as to enable the character collate processing to be accomplish at a high speed.

To achieve the object above, according to the present invention, a collation is conducted between characters to undergo a search operation and search object characters by use of an FSA to determine at a time whether or not character streams which undergo a search operation and which include characters represented with codes include a plurality of search object character streams; when there exist matched search object characters as a result of the collation, the state is changed to a state indicated by the FSA; otherwise, a failure processing is accomplished to change the state to a transition destination uniquely determined in the configuration of the FSA, and the failure processing is completed at a count of a predetermined upper-limit value for each search character to undergo the search operation.

In the method of character stream search according to the present invention, there is established an upper limit of the utilization count of the failure function for each character depending on the read speed of character stream data from the character stream store means. The failure processing to be effected when the upper limit is exceeded is expressed by use of an FSA as in the case of the method 1 above, which enables the period of time required to generate the FSA to be reduced to about the period of time required to generate the FSA in the method 1 above. In addition, like in the case of the method 1, the number of characters to be processed in a unit of time can be fixed, thereby enabling the input section of the character stream search apparatus to be simplified and to be easily controlled.

Next, description will be given of the basic principle of the method according to the present invention.

FIG. 5 is a state transition diagram of an FSA for explaining the basic principle of the method according to the present invention.

The FSA of FIG. 5 is used, like that shown in FIG. 3, to search three character streams including "ABX", "CABY", and "DCABZ". FIG. 6 shows a failure function table associated with the FSA. In this example, the utilization count of the failure function is limited to an upper limit of two. Since the failure count is limited to two in the failure function table of FIG. 6 and the FSA of FIG. 5, for the states 10 and 11 of which the failure count exceeds two, an addition of the transition destination or a change of the failure destination is achieved for the states 5 and 6 which are used as the failure destinations. That is, for the state 5, the state number effected by failure is changed to the state 0, whereas for the state 6, there is added a new transition path for effecting a transition to the state 3 in response to a character "X" and the state number effected by failure is changed to the state 0.

The FSA can be generated, for example, by use of the following method. First, according to the conventional method 2, the FSA of FIG. 3 and the failure function table of FIG. 4 are generated. Next, the failure function table of FIG. 4 is checked and for the states 10 and 11 of which the failure count exceeds two, there is added a processing to limit the failure count. That is, in this case, let us consider the states 5 and 6 which are the first failure destinations of the states 10 and 11. Processing to limit the failure count of the states 5 and 6 to one is then to be added. First, for the state 6, since the transition initiate character "Y" from the state 7 is different from the transition initiate character "X" from the state 2 as the failure destination of the state 6, a transition path to the state 3 associated with "X" is additionally established. For the failure function table, the state number effected by failure is changed from the state 2 to the initial state number 0. Next, the similar processing is also achieved for the state 5. In this case, the transition initiate character "B" to the state 6 is identical to the transition initiate character "B" from the state 1 effected by failure; consequently, an additional transition path to the state 5 is not established. Furthermore, the state number effected by failure is changed from 1 to the initial state number 0. The processing above is repeatedly accomplished for all states of which the failure count exceeds two so as to generate the FSA according to the present invention.

An FSA in which the failure count is limited can also be generated in a method other than that described above. In this method, the FSA for which the failure count is limited to two is configured as shown in FIG. 7 and the failure table becomes as shown in FIG. 8. Also in this case, like in the method described above, the FSA of FIG. 3 and the failure table of FIG. 4 are generated by use of the conventional method 2. Next, for the states 10 and 11 for which the failure count exceeds two, it is checked whether or not the characters other than the transition initiate characters from the states 10 and 11 are found as transition initiate characters for the transitions from the state 5 and 6 which are the transition destinations of the states 10 and 11. If this is the case, the transitions due to the transition initiate characters are added to the states 10 and 11. At the same time, for the pertinent state, the transit state number of the failure function table is changed to the next failure destination, namely, the state number effected by the second failure. In this case, a transition from the state 11 to the state 7 associated with a character "Y" is additionally established; moreover, the failure destinations of the states 10 and 11 in the failure function table are updated to the states 1 and 2, respectively.

With reference to an example of a case where the failure count is limited to a maximum of two, description has been given of a method of generating an FSA and a failure function table according to the present invention. Also in a case where the failure count is to be limited to one and in a case where the failure destination is not limited to the state 0, the FSA and the failure table can be generated in the completely same fashion.

As can be clear from the description above, when generating an FSA for which an upper limit is established for the failure count, there is not required a complex processing, and although the locations requiring the processing depends on the interrelationship with respect to the character streams as the search object, the number thereof does not become inappropriately great. Consequently, although the period of time required to generate the overall FSA is slightly longer than that required in the conventional method 2, the period of time is greatly minimized as compared with the conventional method 1.

FIG. 9 shows a concrete example associated with the period of time required to generate the FSA according to the present invention. In this graph, marks △, □, and ○ designate the curves associated with the method 1, method 2, and the method according to the present invention, respectively. The measurement conditions are as follows.

(1) Character code: KEIS codes and EBCDIK codes (the KEIS codes are the standard character codes of the Hitachi Ltd. representing characters including kanji (Japanese ideographic characters) with two-byte codes).
(2) Character stream length: Ten bytes/word
(3) Programming language: FORTRAN
(4) Computer: 32-bit CPU In this case, however, for the FSA in the method of the present invention, the failure count is limited to two. In consequence, the failure destination is the initial state.

As shown in FIG. 9, in a case where the number of key words is 200, the method 1, the method according to the present invention, and the method 2 respectively require 1500 ms, 470 ms, and 360 ms to generate an FSA.

As compared with the method 1, the time required in the method of the present invention is reduced to about a third of the time required to generate the FSA in the method 1. This is because the transition destinations for the unmatched condition are processed at a time by use of the failure processing in the method according to the present invention, whereas in the processing of the method 1, all transition destinations are attained for each transition state. As compared with the method 2, the processing time is increased by about 30% in the method of the present invention because there is added a processing in which for all states for which the failure destination is other than the state 0, the transitions are entirely described in the FSA.

As described above, according to the present invention, the period of time required to generate an FSA is reduced and the number of characters processed in a unit of time if fixed; as a result, a character stream searching apparatus having a simplified and easily controllable input section can be implemented.

BRIEF DESCRIPTION OF THE DRAWINGS

The present invention will be apparent from the following detailed description taken in conjunction with the accompanying drawings in which:

FIGS. 5, 7, 10, 19, 23, and 24 are schematic diagrams showing the principle of the character stream searching method by use of the FSA according to the present invention;

FIGS. 6, 8 and 13 show a failure function table, respectively;

FIGS. 12, 21, 26, and 30 are explanatory diagram useful to explain the state transition table according to the present invention;

FIG. 14 is a schematic diagram showing a search result table;

FIG. 27 is an explanatory diagram useful to explain a preprocessing failure function table according to the present invention; and FIG. 28 is a schematic diagram showing a sub-goto function table according to the present invention.

DESCRIPTION OF THE PREFERRED EMBODIMENTS

Next, description will be given of an embodiment of a character stream search apparatus based on the principle according to the present invention.

Figure 10:
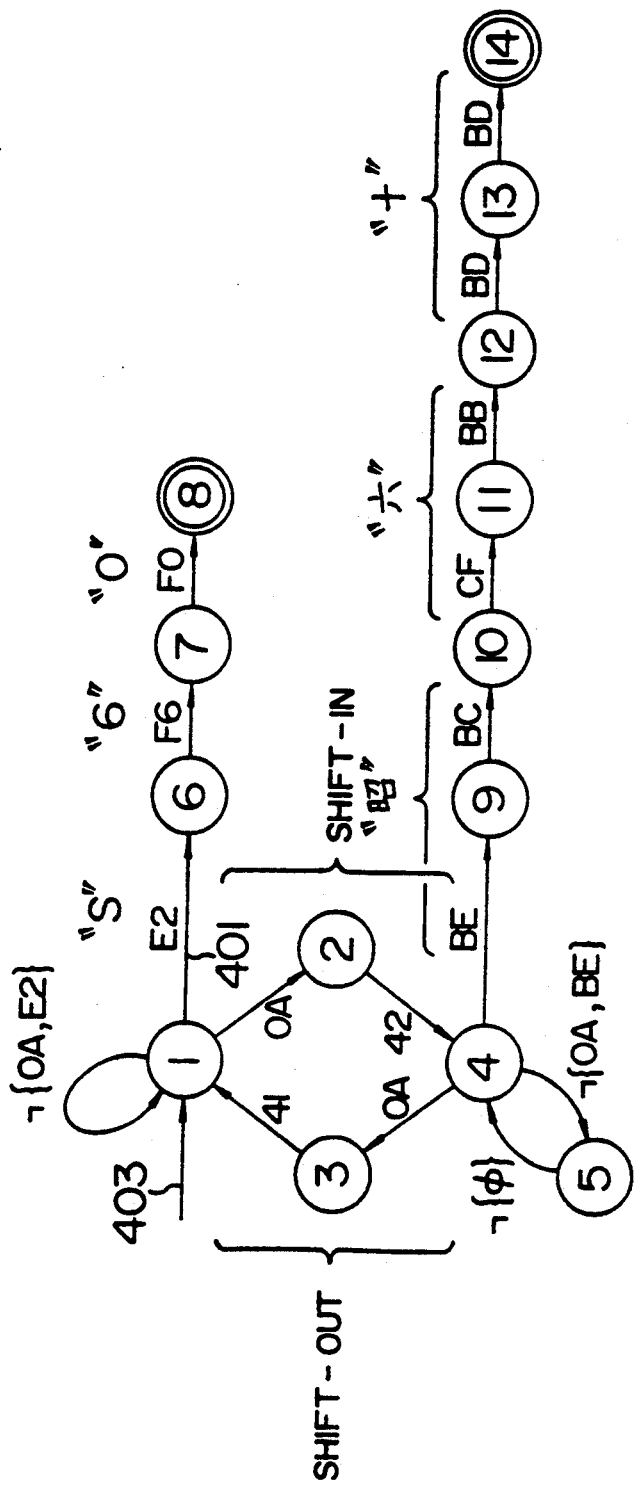

First, a method of the first embodiment will be described according to the present invention. In this method, the failure destination is not limited to one, namely, this method is applied to a case where a plurality of failure destinations are required to be established. That is, this method is effective when a plurality of failure destinations are required, for example, in a case where a search operation is effected on a character stream including EDBDIK codes and KEIS codes. Description will now be given, for example, of a case where a character stream "S60" represented with EBCDIK codes and a character stream " 昭和六十 " (SYOWA-SIXTY) expressed with KEIS codes are to be subjected to a search operation. The character stream "S60" is represented as (E2F6F0) in the EBCDIK code system, whereas the character stream " 昭和六十 " (SYOWA-SIXTY) is expressed as (BEBCCFB in the KEIS code system. In consequence, an FSA to be employed to search these character streams according to the present invention is generated as shown in FIG. 10.

Alphabet letters assigned to an arrow designate an input character code which causes a state transition associated therewith. The changeover code, namely, SHIFT-IN, from the EBCDIK code mode to the KEIS code mode is (0A42), whereas the change-over code or SHIFT-OUT for the reverse shift operation is (0A41). These codes respectively cause state transitions as the state 1→state 2→state 4 and the state →state 3→state 1. In addition, the initial input code is assumed to be represented with EBCDIK codes.

Consequently, in a case where a character stream "S60" is inputted, a state transition takes place as the initial state→state 6→state 7→state 8, and in the final state 8, an existence of the character stream "S60" in the character streams to be subjected to the search operation is detected. In addition, if there is subsequently inputted a SHIFT-IN code followed by a character stream "昭和六十" (SYOWA-SIXTY), the state is sequentially changed as 1→2→4→9→10→11→12→13→14, and in the final FSA state 14, there is detected an existence of the character stream " 昭和六十 " (SYOWA-SIXTY) in the character streams having undergone the search operation.

In this situation, in a case where, for example, a character stream "S61" (E2F6F1) is inputted, the state is changed as the state 1→state 6→state 7; thereafter, when a character "1" is inputted, a failure transition occurs to change the state to the state 1 in which the collate processing for the pertinent input character "1" is required to be repeatedly achieved. In addition, in a case where a character stream "昭和六十"(SYOWA-SIXTY) (BEBCCFC2CFBBBDBD) is received in a KEIS code input mode, when a low-byte code (C2) of a character " 和 " (WA) is inputted in the state 11, a failure transition takes place to the state 5 and thereafter a state transition occurs to the state 4. On the other hand, when a character string "昭和六十"(SYOWA-SIXTY ONE)(BEBCCFB-BBOEC) is inputted, a failure transition to the state 4 results due to a high-byte code (B0) of a character "  " (ONE) in the state 12, and the state then is changed to the state 5; thereafter, with a low-byte code (EC) of the subsequent character "  " (ONE), a state transition to the state 4 takes place. In this operation, the state transition from the state 5 to the state 4 is achieved for a byte adjustment, which is to be effected when the low-byte code of the KEIS codes detected when an unmatching occurs for the high-byte code is removed from the processing object so as to proceed to the processing of the next character code.

Figure 11:
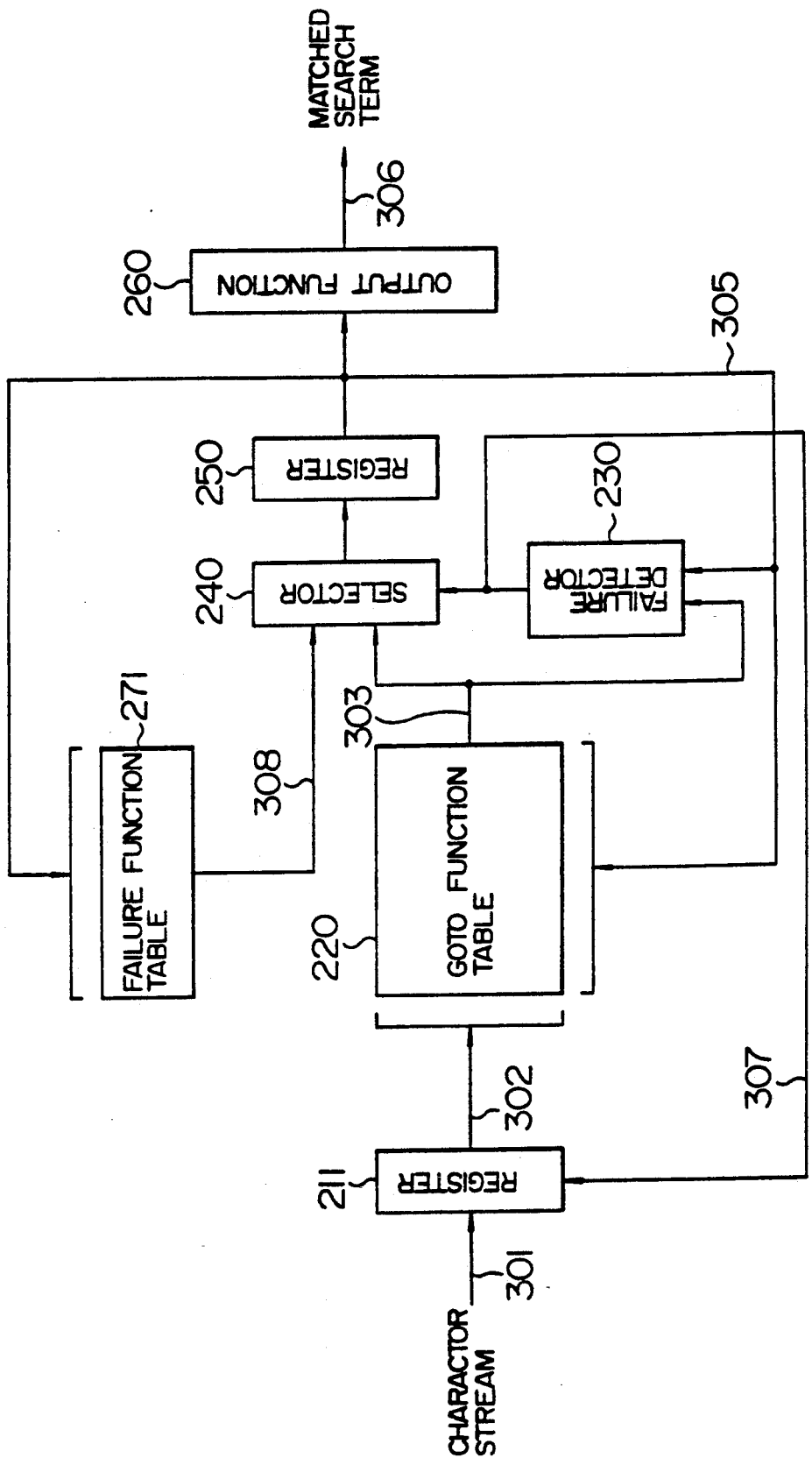
FIGS. 11, 15, 16, 17, 18, 20, 22, 25, and 29 are block diagrams showing constitutions of embodiments of the character stream searching circuits by use of the FSA according to the present invention.

Namely, the state 1 is a failure destination or a succeeding state of failure processing associated with the EBCDIK codes, the state 4 is one related to a low-byte code of the KEIS codes, and the state 5 is one corresponding to a high-byte code of the KEIS codes. In order to simply describe an FSA for a search of a character stream including EBCDIK and KEIS codes as described above, there are required three locations for the states effected by failure, namely, three locations in the states, 1, 4, and 5, respectively. FIG. 11 shows a block diagram of an embodiment of a configuration having a plurality of succeeding states to failure processing.

A character stream 301 read from the search data base 105 is stored in a register 210 in a character-by-character fashion. A character code 302 outputted from the register 210 is inputted as address information in a goto function table 220 in which a transition table of an FSA according to the present invention is stored. The goto function table 220, based on a number of a current state (to be referred to as a current state number herebelow) 305 and the character code 302, outputs a number 303 of a succeeding state to failure processing (to be referred to as a transit state number) to which a transition is next to be effected. As an initial value of the current state number, an initial state number is established. In a failure function table 274, there are stored, corresponding to the respective current state number, state numbers of states effected by failure to which a transition to be effected when a failure is occurrs. The goto function table 220 and the failure function table 274 are used to respectively store therein the state transition or goto function table of FIG. 12 and the table of states effected by failure of FIG. 13. These items are disposed corresponding to the FSA of FIG. 10. A failure detector 230 detects an occurrence of a failure based on the transit state number 303 and the current state number 305 of FIG. 12 outputted from the goto function table 220, and furthermore, causes a new character input to the register 210 to be set to the wait state if a failure is detected. The failure detector 230 assumes a failure to have taken place when the current state number 305 is not 0 and the transit state number 303 is 0. A selector 240 selects the transit state number 303 when a failure is occurs, whereas the selector 240 selects the number of a state effected by failure 308 as the transit state number for an occurrence of a failure when a failure takes place and then outputs the selected number to a register 250. The transit state number outputted from the selector 240 is stored in the register 250 and is then delivered as the current state number 305. The register 210 in an ordinary state (where a failure does not take place) receives character stream data in synchronism with the register 250; however, when a failure occurs, the register 210 keeps the character stream data and is set to and remains in a wait state until the failure is recovered. In an output function or collation result table 260, there are stored particular codes respectively identifying character streams corresponding to the states (states 8 and 14 in the case of FIG. 10) of the FSA for the final points of the character streams.

FIG. 14 shows the contents of the output function 260 associated with the FSA of FIG. 10. The contents other than 0 indicate character stream numbers. That is, when a character stream number corresponding to a state number is other than 0, the data is sent as a matched search term to the query resolver 103.

When the operation above is repeatedly effected for each character constituting an input character stream through an execution of the FSA of FIG. 10, a search processing is accomplished.

According to the embodiment as described above, there are disposed a plurality of states effected by failure for which the number of failure processes or the failure count is limited to one; consequently, a search of a character stream including the EBCDIK and KEIS codes can be implemented by use of a relatively simple FSA in a circuit constitution of a relatively small size.

Figure 15:
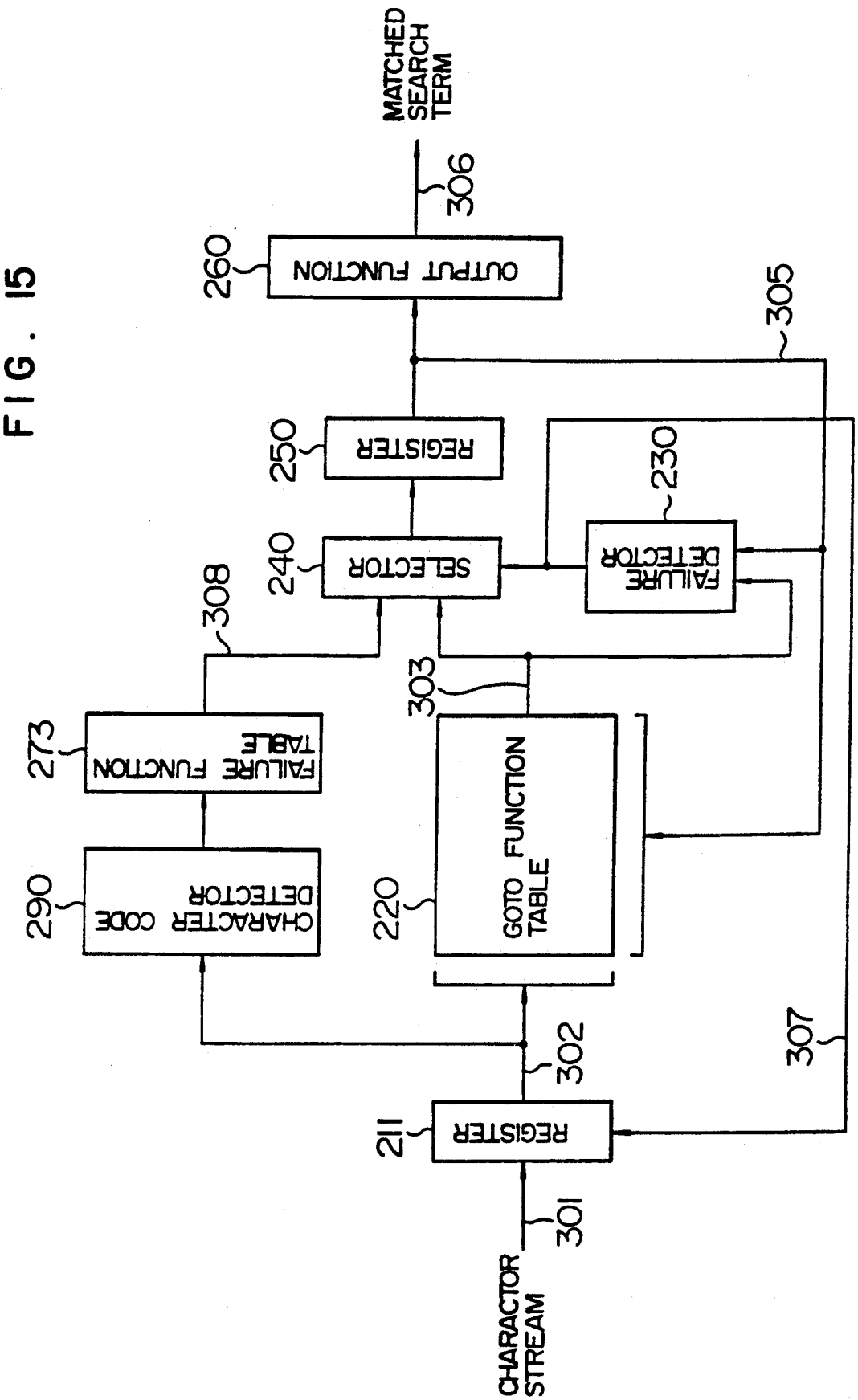

Next, description will be given of the second embodiment according to the present invention. In this method, the size of the failure function table 271 of the first embodiment is reduced. According to the first embodiment, there are disposed three states effected by failure depending on whether the processing character code is an EBCDIK code, a high-byte code of KEIS code, or a low-byte code thereof. Consequently, in the failure function table, such three state numbers effected by failure are duplicately described for all states corresponding to the respective character codes. To overcome this disadvantageous feature, if it is allowed to select a state effected by failure depending on a kind of the character code, the duplication of the description can be removed and hence the size of the failure function table is reduced. An embodiment of this method will be described with reference to FIG. 15. A character code detector 290 outputs different codes according to the types of character codes, and a failure function table 273 outputs a number 308 of a state effected by failure depending on the code thus outputted. The character code detector 290 outputs 0, 1, and 2 for an EBCDIK code, a high-byte code of KEIS code, and a low-byte code thereof, respectively. The failure function table 273 is arranged such that the state 1, 4, or 5 is outputted as the number 308 of state effected by failure when the output from the character code detector 290 is 0, 1, or 2, respectively. In this arrangement, even when a character stream comprising EBCDIK and KEIS codes is inputted, the state transition can be conducted according to the FSA of FIG. 10.

According to the embodiment above, there can be implemented a character stream search apparatus in which a search of a character stream including a plurality of character codes can be achieved with a small-sized failure function table.

Figure 16:
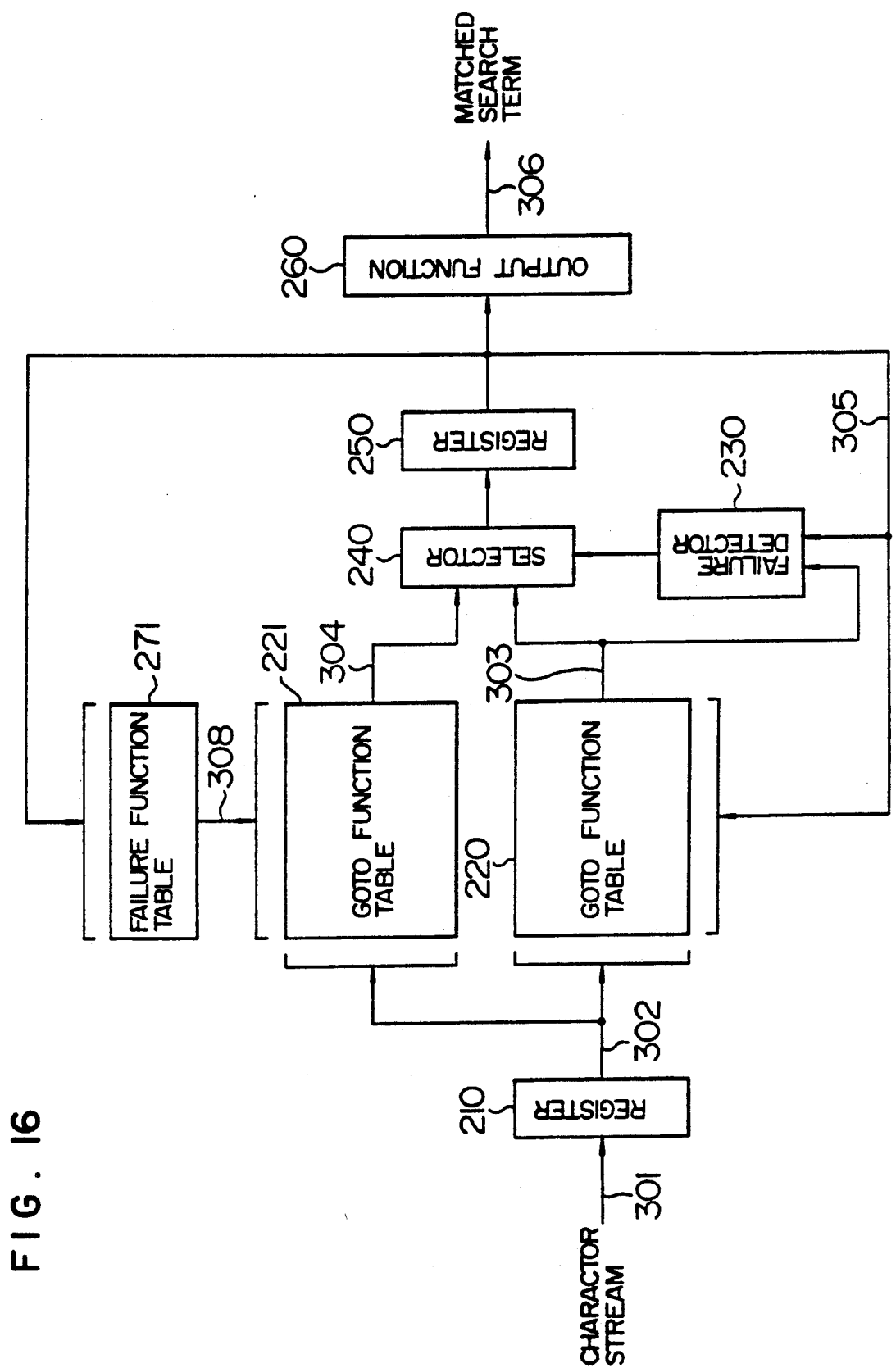

Next, description will be given of the third embodiment according to the present invention. Like the first embodiment, this method is also applied to a case where the number of states effected by failure is not limited to one and a plurality of state effected by failure are disposed. The first embodiment is attended with a problem that two cycles are required for the state processing when a failure occurs. In this method, even at an occurrence of a failure, the state processing can be completed in a cycle. FIG. 16 shows a hardware block diagram in which this method is to be implemented. According to the configuration of this method, a failure function table 271 to which the number 308 of state effected by failure at an occurrence of a failure is registered and a goto function table 221 dedicated to a failure processing are added to the goto function table 220 and the failure detector 230. The contents of the goto function table 221 dedicated to a failure processing are completely identical to those of the original goto function table 220. With this configuration, even when a failure occurs, the state transition can be processed in a cycle. That is, in concurrence with an operation to read out the transit state number 303 attained by referencing the goto function table 220 corresponding to the input character code, an operation to read out the number 308 of state effected by failure for the current state number 305 from the failure function table 271 and an operation to read out the transit state number (to be referred to as the number of succeeding state to failure processing herebelow) 304 after a failure from the goto function table 221 based on the number 308 of state effected by failure are executed at the same time. In a case where a failure is detected as a result of the read operation of the current state number 305, the selector 240 changes over the output number to the number 304 of succeeding state to failure for which the read operation has already been completed.

According to the embodiment as described above, even when a failure takes place, the state transition for an input character code can be processed in a cycle.

Figure 17:
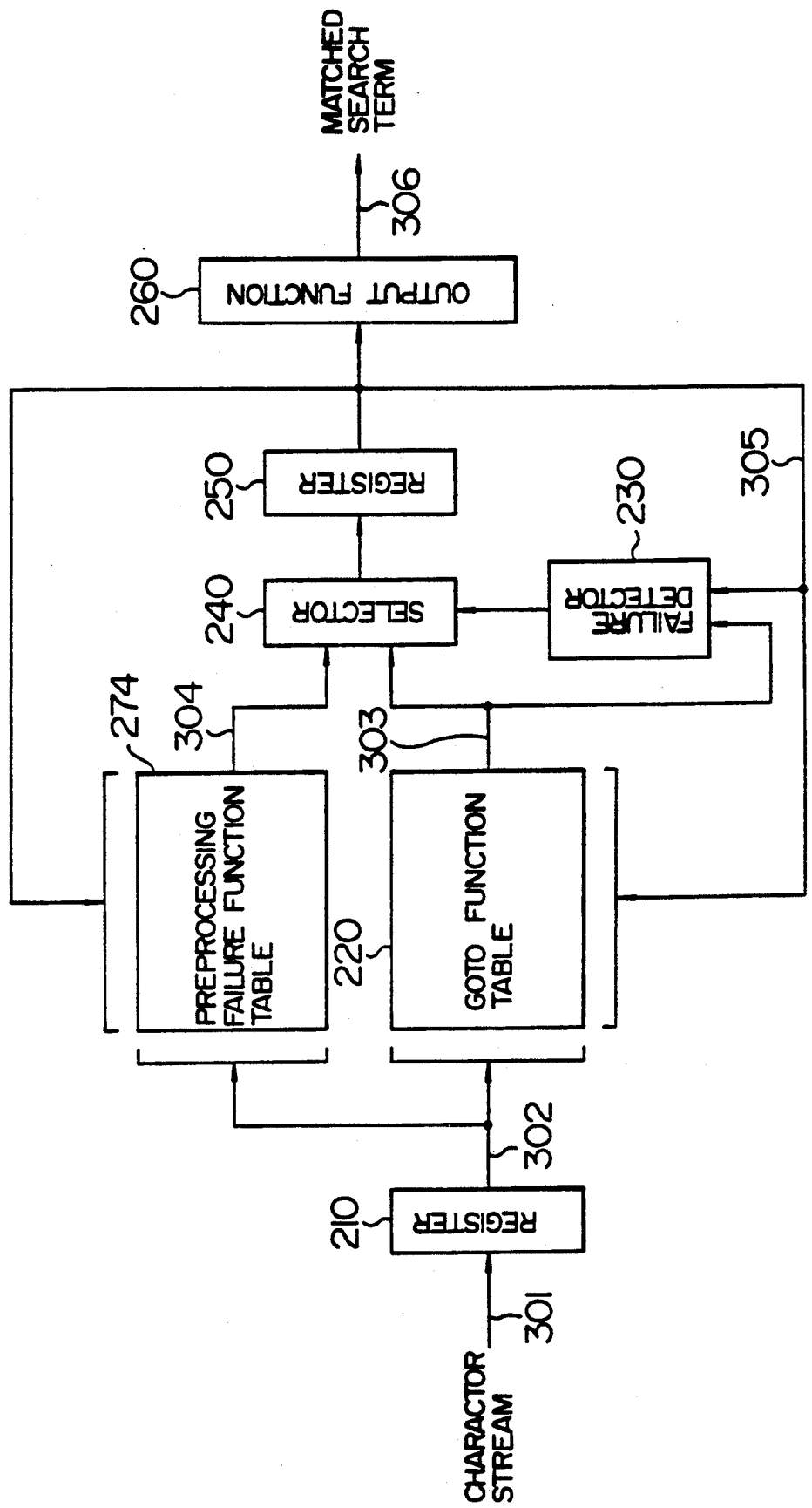

Next, description will be given of the fourth embodiment according to the present invention. Like the first embodiment, this method is also applied to a case where the number of states effected by failure is not limited to one, namely, a plurality of states effected by failure are disposed In the third embodiment, the problem associated with the first embodiment, namely, the problem that two cycles are required to achieve the transition processing at an occurrence of a failure is solved; however, there exists a disadvantage that two goto function tables are required. According to the fourth embodiment, the failure function table of the third embodiment is removed so as to minimize the size of the circuit to the maximum extent. FIG. 17 shows a block diagram of a hardware system in which this method is implemented.

In this method, the failure function table 271 and the goto function table 221 are combined into a table called a preprocessing failure function table 274 dedicated to a failure processing. In consequence, the failure function table 274 contains data which is obtained by replacing the contents corresponding to the respective state numbers of the goto function table 220 of the embodiment 1 shown in FIG. 12 with those corresponding to the numbers of states effected by failure shown in FIG. 13. As a result, the failure function table 271 employed in the third embodiment becomes unnecessary.

According to this method as described above, regardless of an occurrence of a failure, the entire state transition can be completed in a cycle; furthermore, as compared with the third embodiment, the size of the circuit can be reduced by the portion associated with the failure function table 271.

Next, description will be given of the fifth embodiment according to the present invention. In the fourth embodiment above, the size of the circuit is reduced as compared with the third embodiment; however, there is required the preprocessing failure function table 274 of which the size is equal to that of the goto function table 220. In consequence, as compared with the first or second embodiment, the size of the circuit is naturally about two times. This is because in the fourth embodiment, for all state numbers in the preprocessing failure function table, there are duplicatedly stored the numbers of states effected by failures respectively associated with three kinds of processing character codes. According to the fifth method, this duplicated portion is removed so as to minimize the size of the preprocessing failure table.

Figure 18:
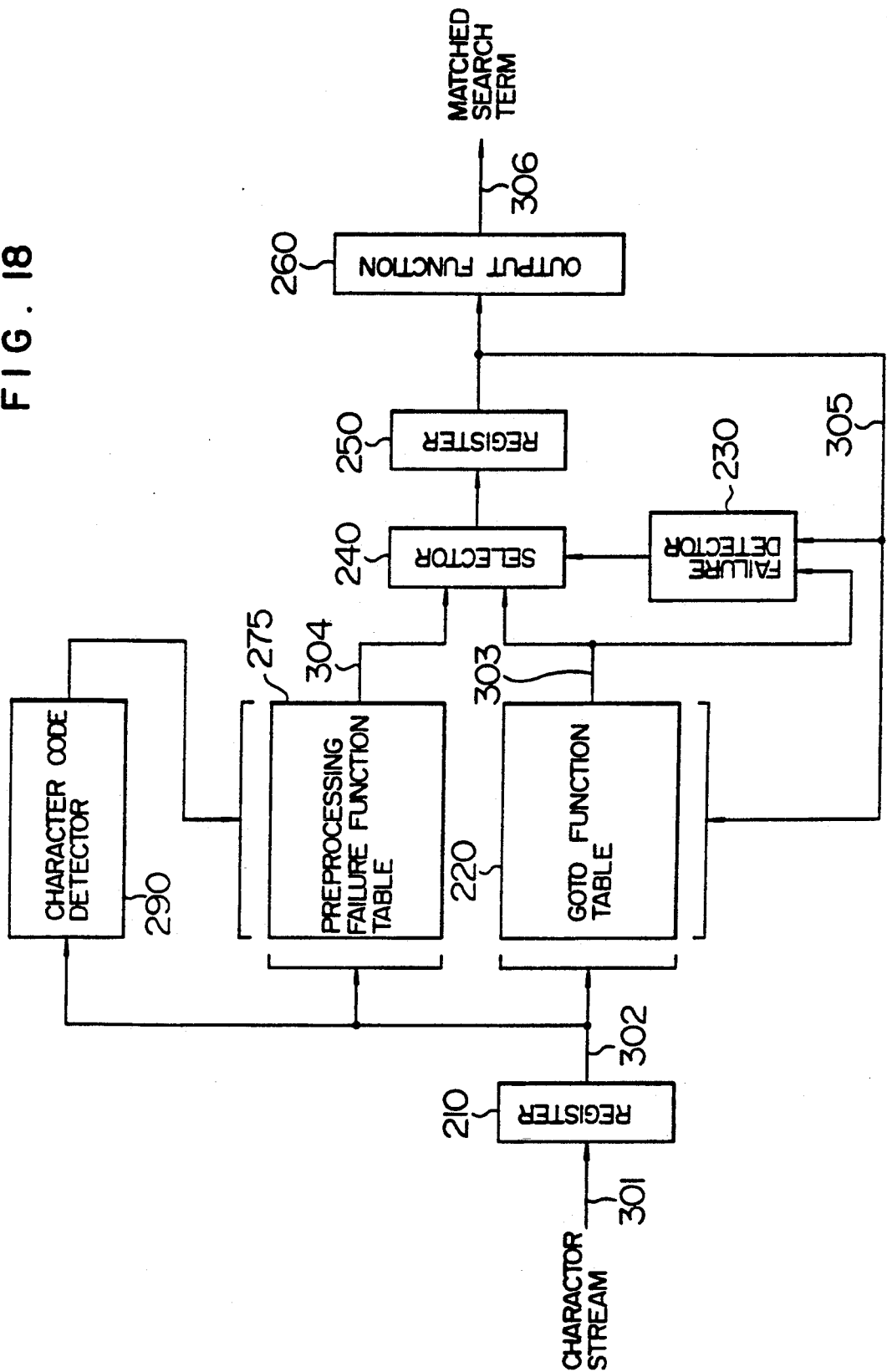

FIG. 18 shows a block diagram of a hardware system in which this method is implemented. In this method, the character code detector 290 employed in the method of the embodiment 2 is adopted such that the failure destination or the state effected by failure of the preprocessing failure function table 275 is changed over depending on the kind of the input character code so as to read out a number of state effected by failure corresponding to the processing character code. According to the fifth embodiment as described above, also at an occurrence of a failure, the transition processing can be completed in a cycle; furthermore, the size of the control circuit can be minimized to be almost the same as that of the embodiment 1 or 2.

Next, description will be given of the sixth embodiment according to the present invention. This method is applied to a case where the state effected by failure is limited to an initial state. For example, when a search is achieved on a document constituted with a single character code system, the states effected by failure can be specified by a state. Furthermore, in addition, in order to increase the processing speed to the maximum extent, if the number of failure processes or the failure processing count is limited to one, the state effected by failure is naturally set to the initial state 0. Consequently, the character code detector 290 employed in the fifth embodiment above becomes to be unnecessary; moreover, the size of the preprocessing failure function table 295 is reduced to a size corresponding to a state thereof.

Figure 1:
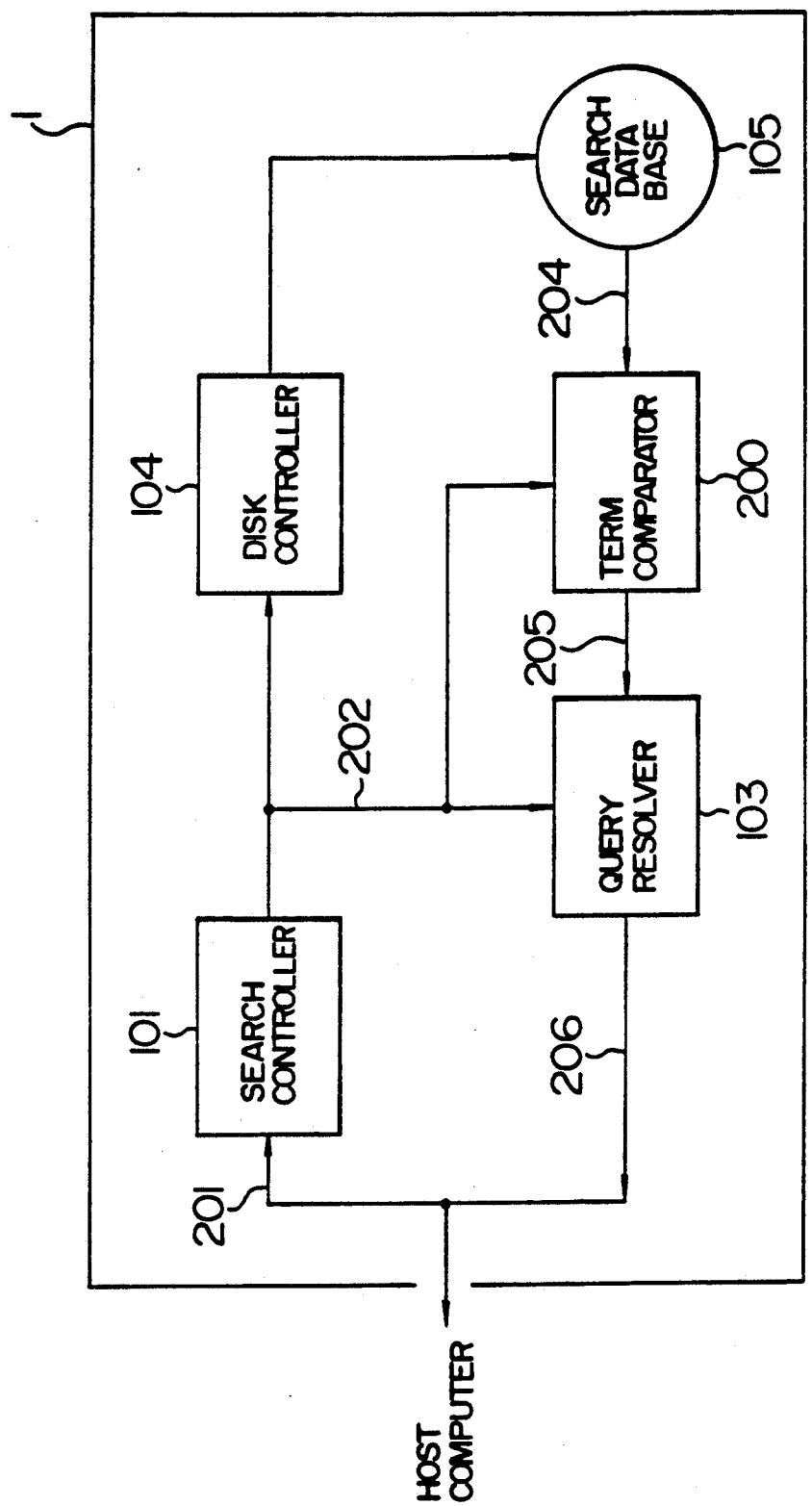
FIG. 1 is an explanatory diagram useful to explain a character searching mechanism.
Figure 2:
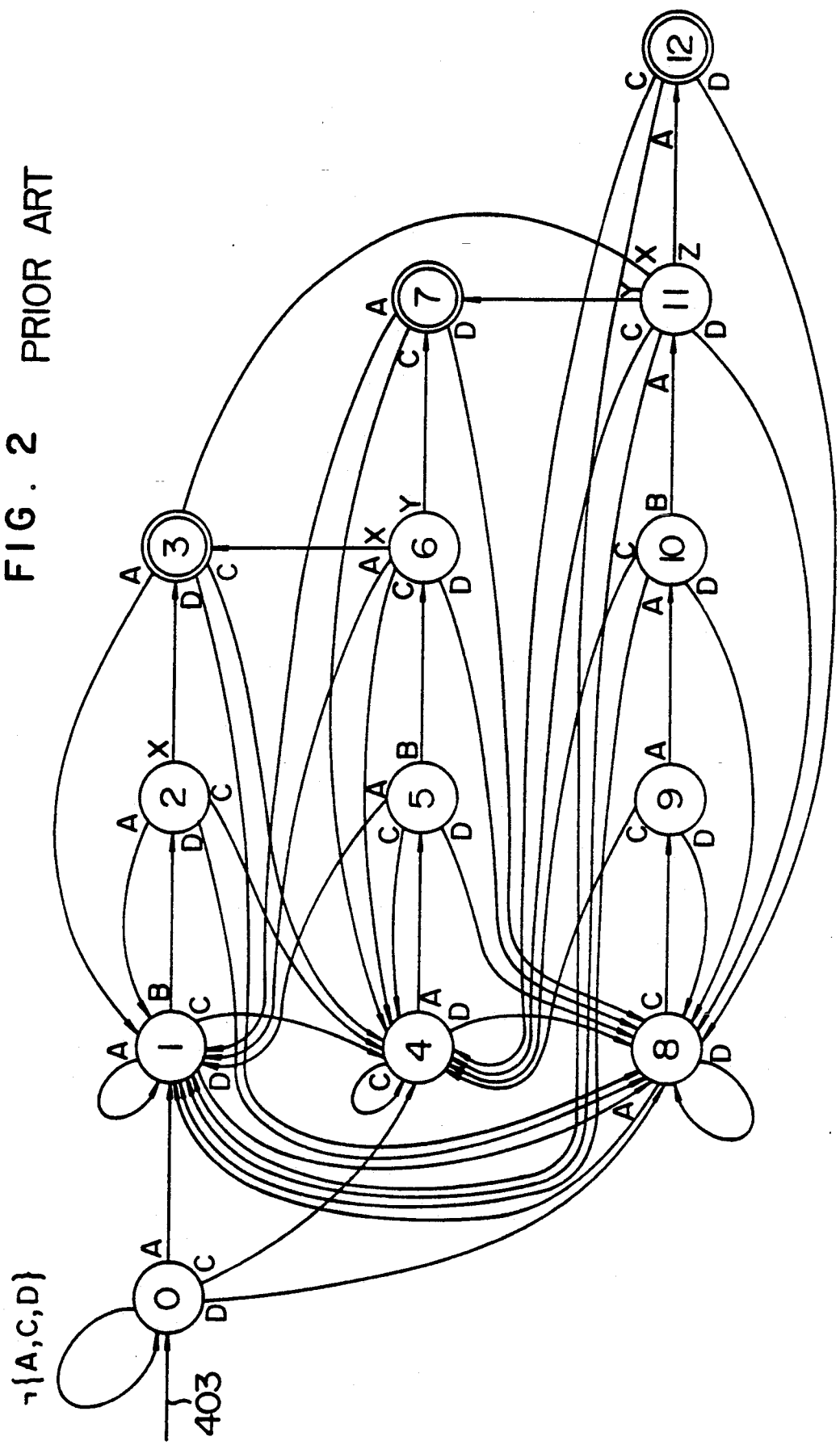
FIGS. 2 and 3 are schematic diagrams for explaining the principle of the character search by use of the conventional FSA.
Figures 3, 4:
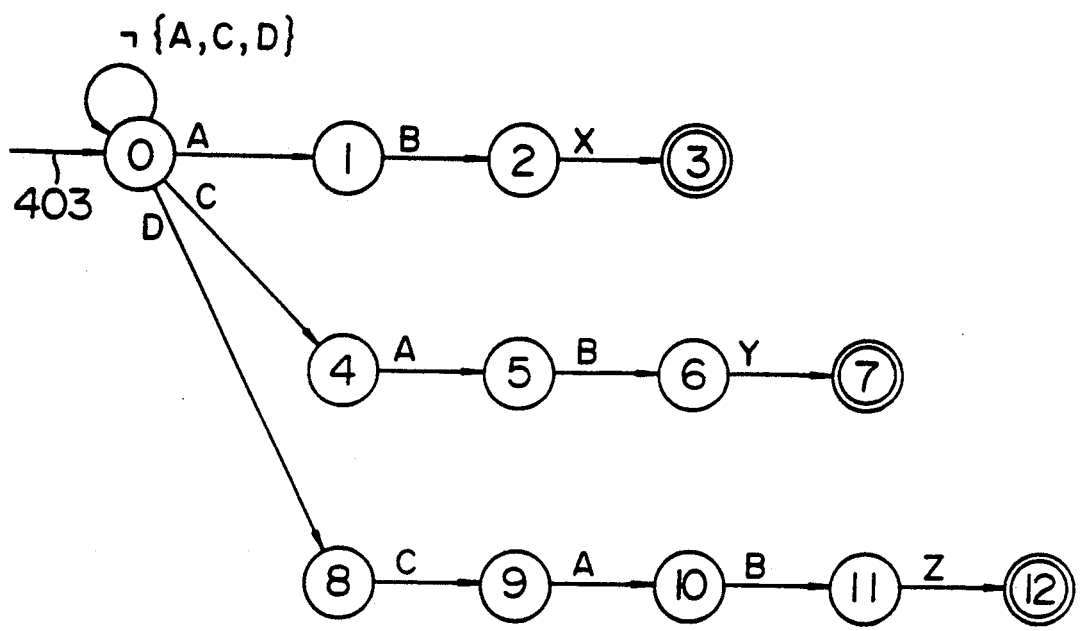
FIG. 4 is an explanatory diagram useful to explain the conventional failure function table.
Figures 5, 6:
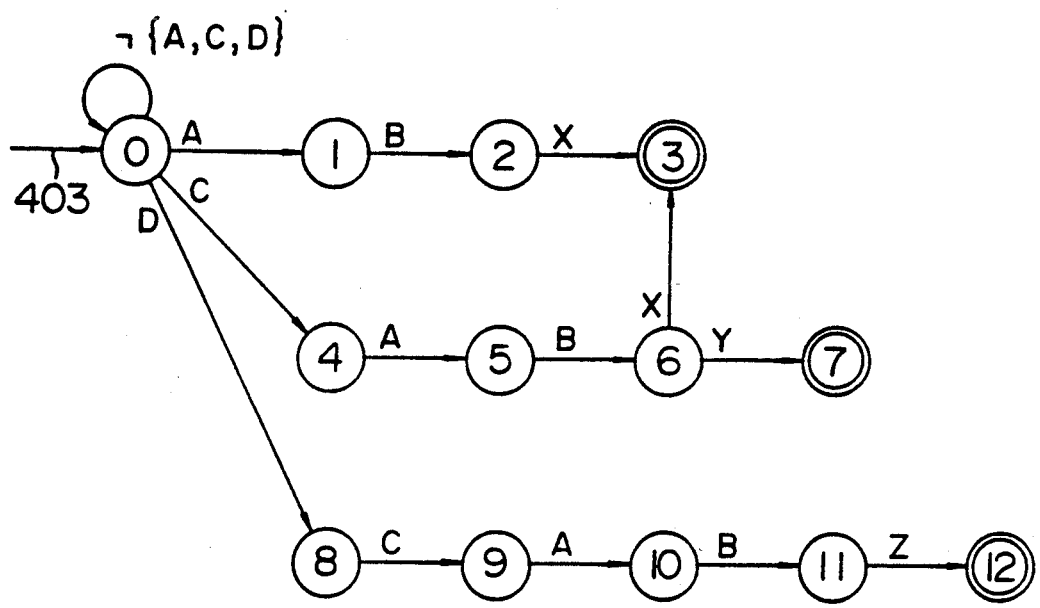
Figures 7, 8:
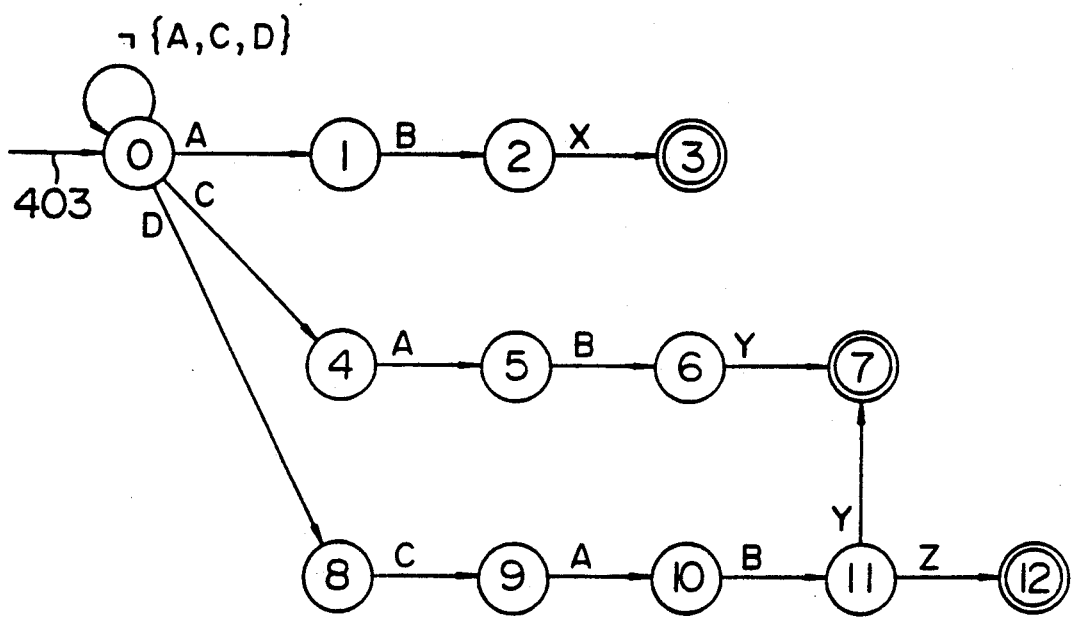
Figure 9:
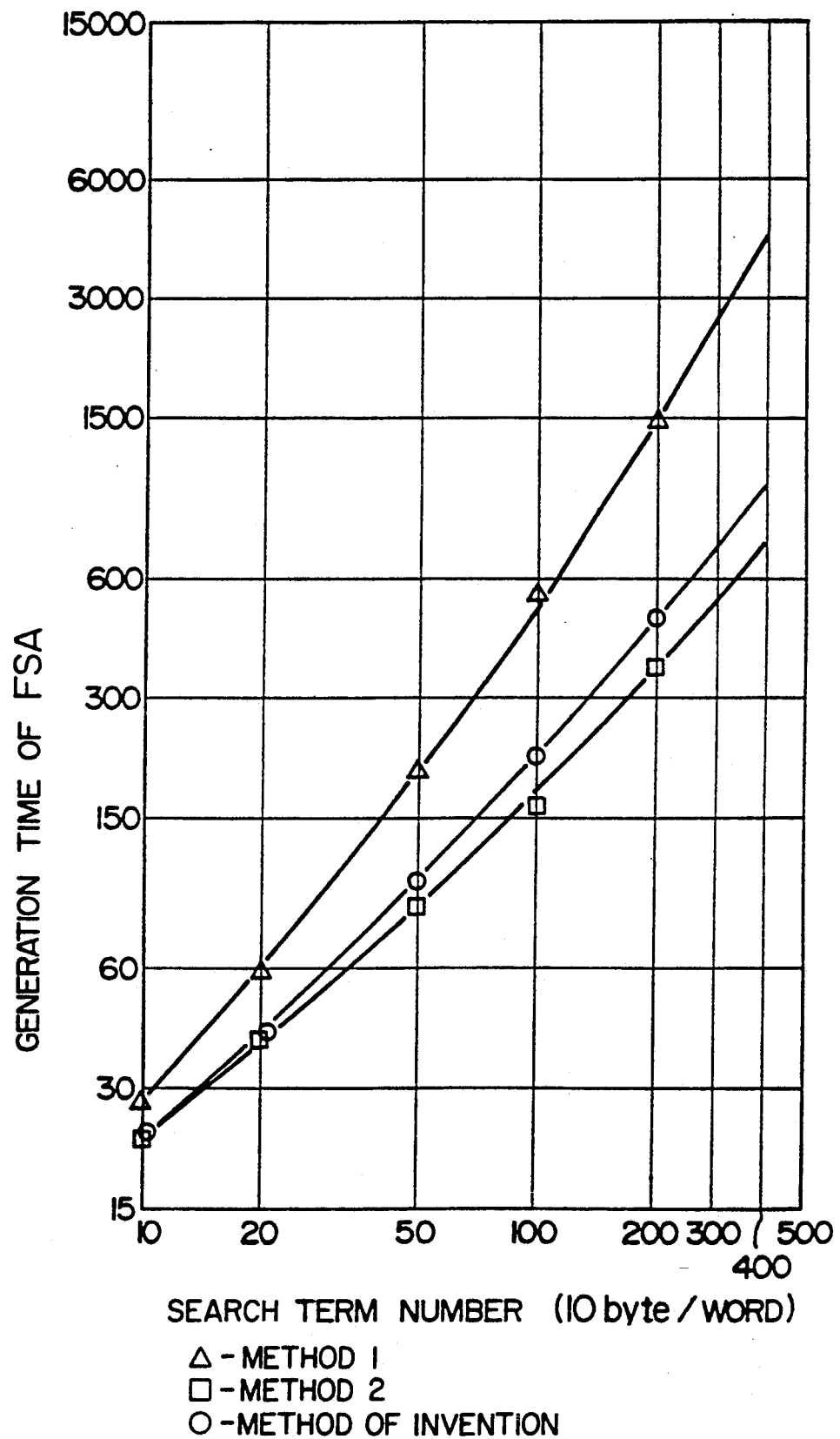
FIG. 9 is a graph showing a comparison of the period of time required to generate the FSA according to the present invention with those associated with the conventional methods.
Figure 19:
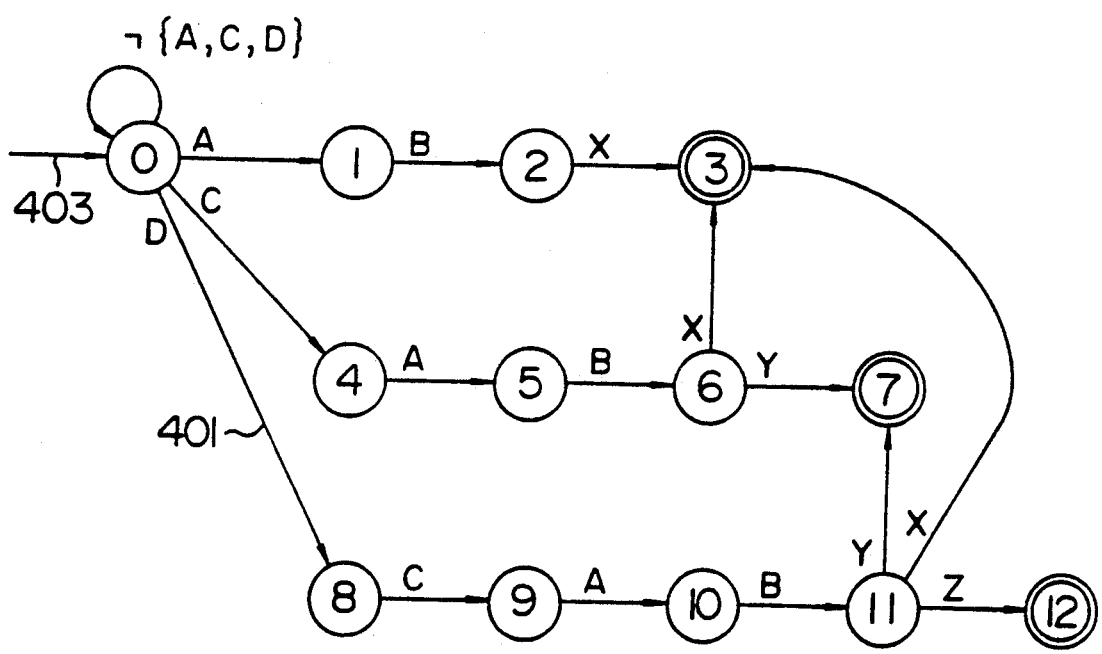

FIG. 19 shows an FSA for which the number of failure process is limited to one according to this method. This is disposed, like the FSA of FIG. 3, to search three character streams including "ABX", "CABY", and "DCABZ". This FSA can be generated by using the method described in conjunction with the principle of the present invention and by limiting the number of failure process to one. As compared with the FSA of FIG. 3, the FSA of 19 additionally includes a transition path from the state 2, which is a state effected by failure from the state 6, to the state 3 in response to a transition initiate character "X", a transition path from the state 11 to the state 3 due to a transition initiate character "X", and a transition path from the state 11 to the state 7 by a transition initiate character "Y".

Figure 20:
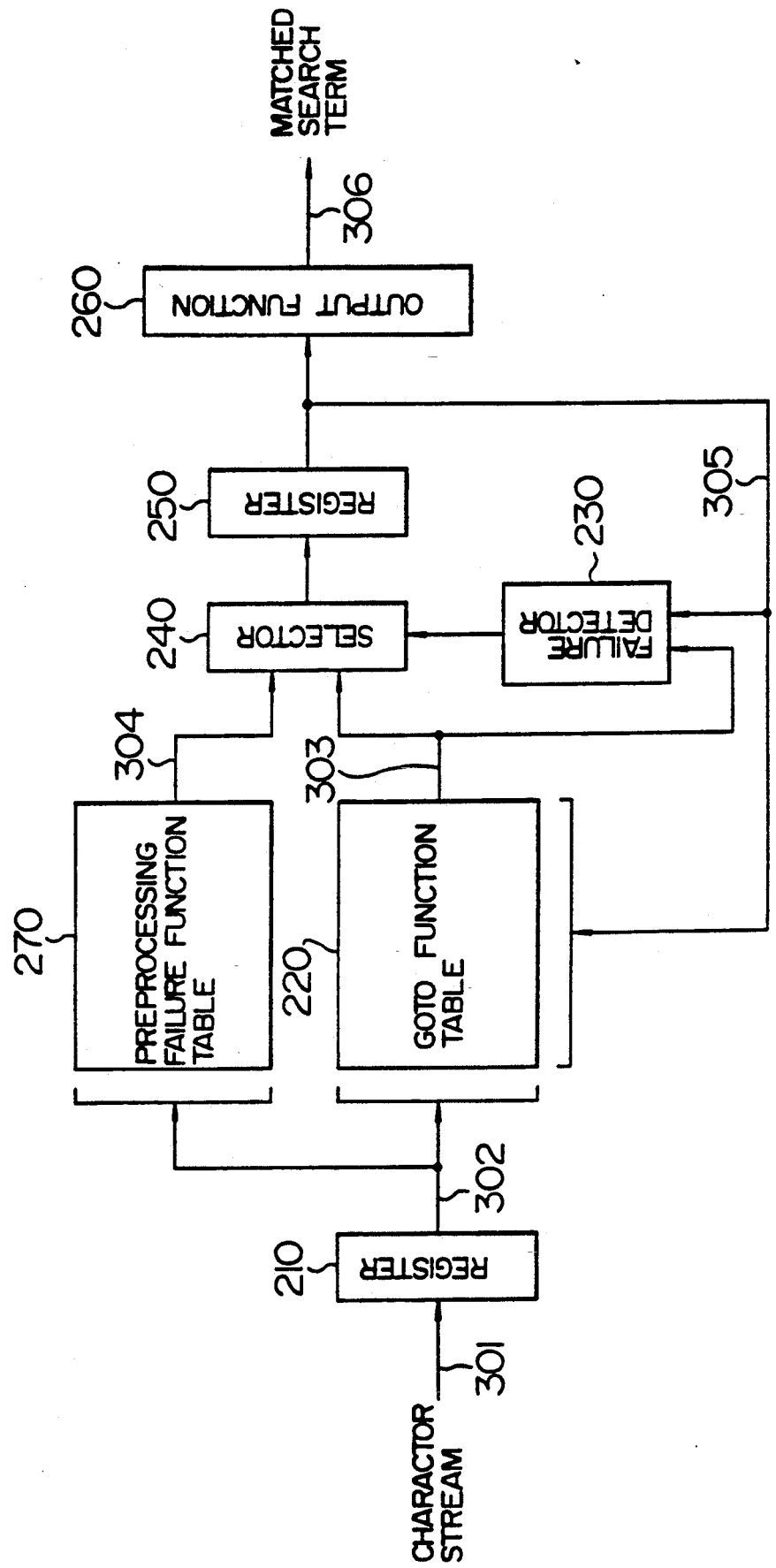

FIG. 20 shows a block diagram of an embodiment of a circuit in which this FSA is implemented. In this method, since the state effected by failure is limited to the state 0, the content indicated by the state 0 of the goto function table 220 is stored in the preprocessing failure function table 270. FIG. 21 shows the contents of the goto function table 220 corresponding to the FSA of FIG. 19. According to this method, like the third, fourth, and fifth embodiments described above, an operation to read a number of a transit state at an occurrence of a failure is beforehand effected so as to concurrently read out the number of the subsequent transit state, thereby achieving the processing of the state transition in a cycle also when a failure takes place. Furthermore, since the size of the circuit can be relatively minimized because the preprocessing failure function table need only be arranged corresponding to a state of the goto function table 220.

Figure 22:
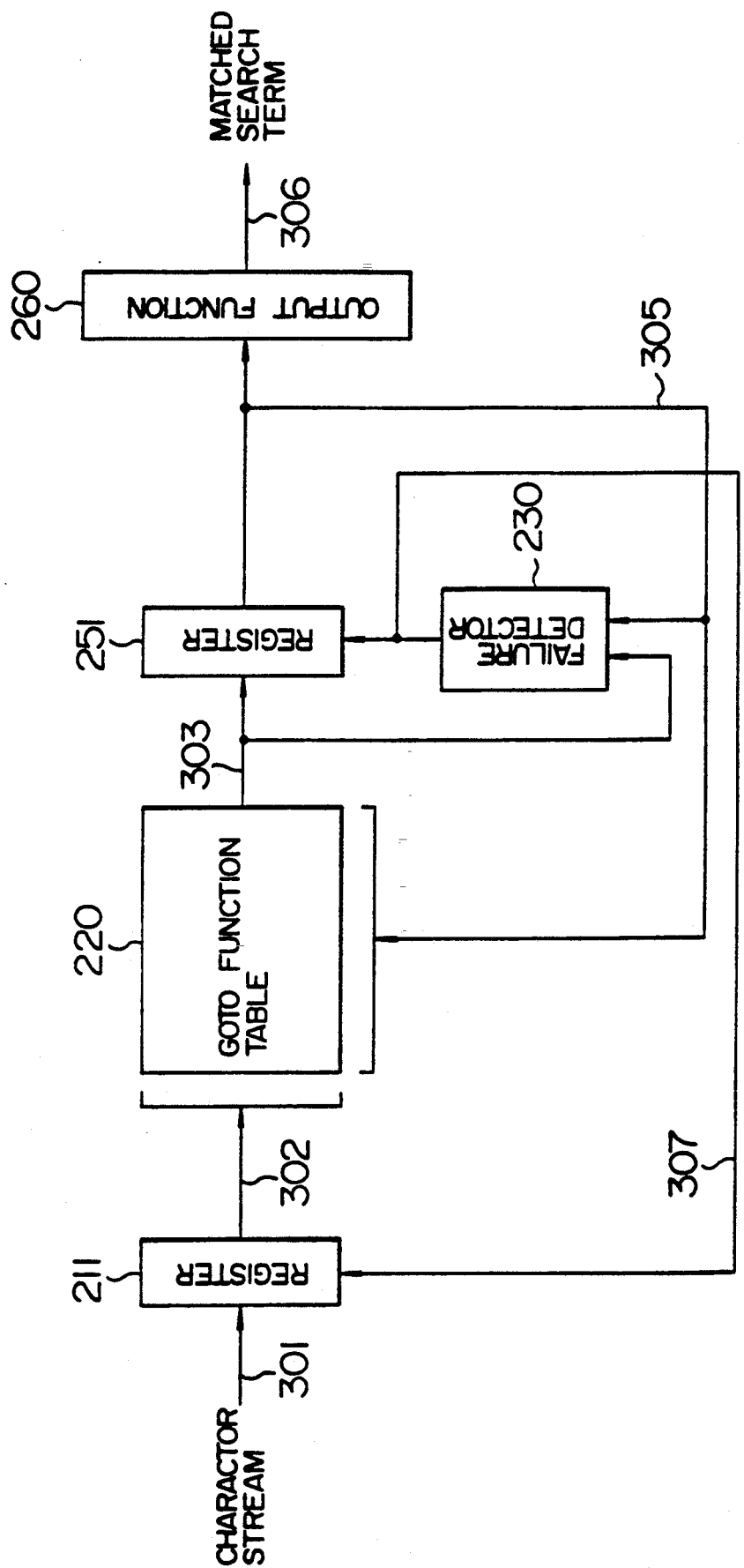

Next, description will be given of the seventh embodiment according to the present invention. This method, like the sixth embodiment, also applies to a case where the number of states effected by failure can be limited to one. In the sixth embodiment, since the failure processing is beforehand effected, there is disposed a dedicated preprocessing failure function table 270 so as to accomplish all state transition processing in a cycle. However, in a case where it is allowed to achieve the state transition processing in two cycles, the preprocessing failure function table 270 can be removed. That is, in this method, the size of the preprocessing failure function table 270 is minimized so as further to reduce the circuit size. FIG. 22 shows a block diagram of a hardware system in which this method is implemented. The failure function table of the case of this method corresponds to a portion where the state number of the goto function table is 0; consequently, the portion of the initial state of the goto function table 220 is employed therefor.

In consequence, when a failure is detected, the register 251 for detecting a state number is cleared to the initial state number 0 and then a collation is again achieved for the input character code 302. That is, in this method, when a failure takes place, the state transition processing requires a period of time of two cycles. In addition, the register 211 in an ordinary case (where a failure does not occur) receives the character stream data in synchronism with the register 251; however, when a failure takes place, an input operation of a new character code is interrupted so as to keep the character code under the input processing and the register 211 enters and remains in a wait state until the failure is recovered.

According to this method as described above, two cycles are required for the state transition processing in a case where a failure occurs; however, the circuit size can be reduced by the portion associated with the preprocessing failure function table to be removed.

Figure 23:
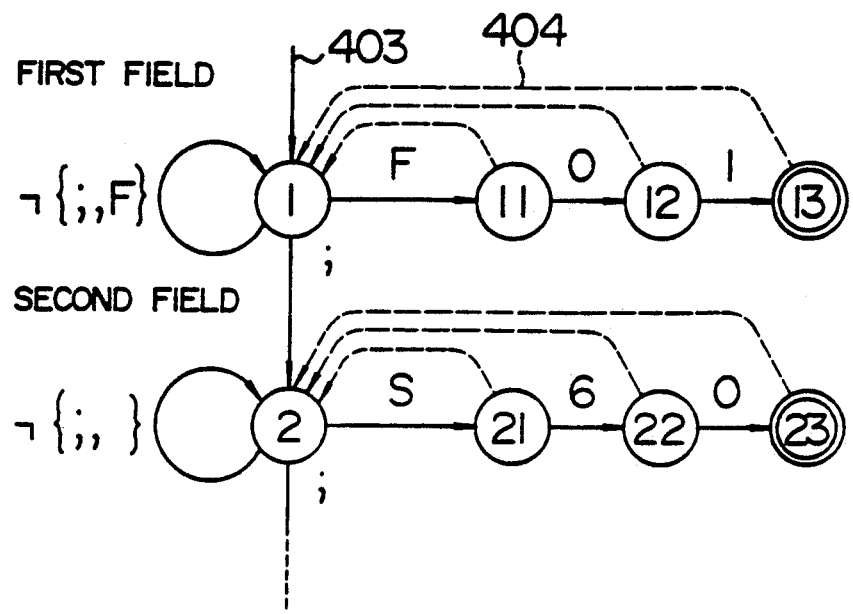

Next, description will be given of the eighth embodiment according to the present invention. This method is implemented by expanding the function of the fifth embodiment such that the search operation is also effected for a character stream constituted with a plurality of fields and a character stream generated by use of a character recognition apparatus. Description will be first given of a case where a search operation is achieved for a character stream including a plurality of fields by use of a set of character streams specified for each field. In this situation, it is required that an independent state effected by failure can be established for each field. That is, for example, in a case where a search operation is effected for a character stream of which the first field contains a document number and the second field contains a name of the era, an FSA shown in FIG. 23 is required. An arrow mark of the dotted line designates a state effected by failure. In this diagram, a field separation code ";" called a separator beforehand determined is inserted between character streams constituting each field so as to change over a state effected by failure. For example, in a case where the processing of the second field is to be effected after the processing of the first field is completed, when the separator ";" inserted between the character stream of the first field and that of the second field is inputted, the state transition occurs from the state 1 to the state 2 and at the same time, the state effected by failure is also changed over to the state 2. In consequence, even when an unmatching condition is detected in a collation of the second field, a failure can be effected to cause a state transition to the state 2 regardless of the state effected by failure associated with the first field. With this provision, an FSA for a search of a character stream constituted with a plurality of fields can be described by use of a relatively simple configuration and hence the generation time of the FSA is reduced.

Figure 24:
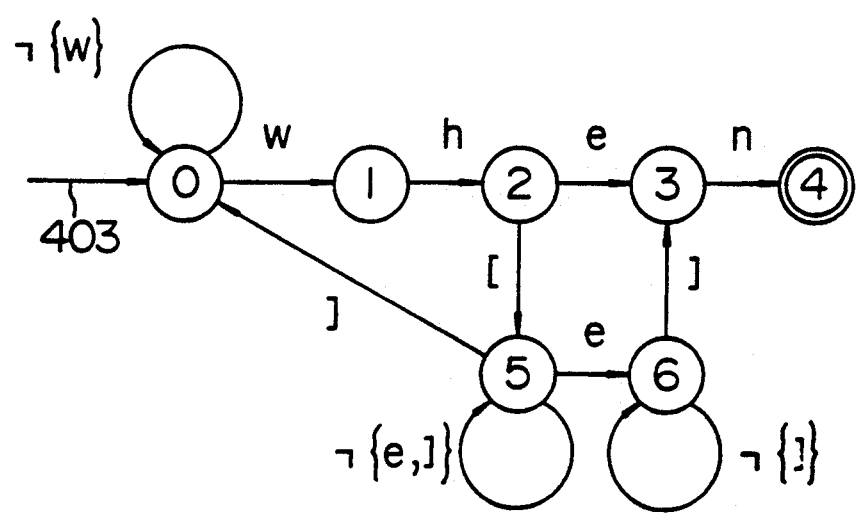

Next, description will be given of a case where a character stream of a document recognized by a character recognition apparatus is to be searched. At the present state of art, it is difficult for the character recognition apparatus to obtain the complete recognition result with a 100% of the recognition rate. In consequence, the document formed through a read operation by means of such a character recognition apparatus includes incomplete recognition results such as an error and unrecognizable items. This means that for such a document, a search cannot be achieved with a correct character stream. As a method to cope with the problem above, for example, when recognizing a character stream "when" in the character recognition apparatus, if there remains ambiguity with respect to a character "e", the candidates for the character from the first candidate to the third candidates are expressed with codes in a collective fashion as "wh[oce]n". Such a document including the ambiguity is called a description form for a matching candidate character set. In a case where a search operation is achieved on the description form for matching candidate character set, there is required an FSA shown in FIG. 24. That is, in the state transition diagram of the FSA, when a search processing is conducted with a character stream "when", only if a character "e" is found in a group of character enclosed with "[" and "]", the state is changed to the subsequent state, namely, the other characters are skipped. As a result, a character stream "when" of the original document can be obtained through the search operation.

Figure 25:
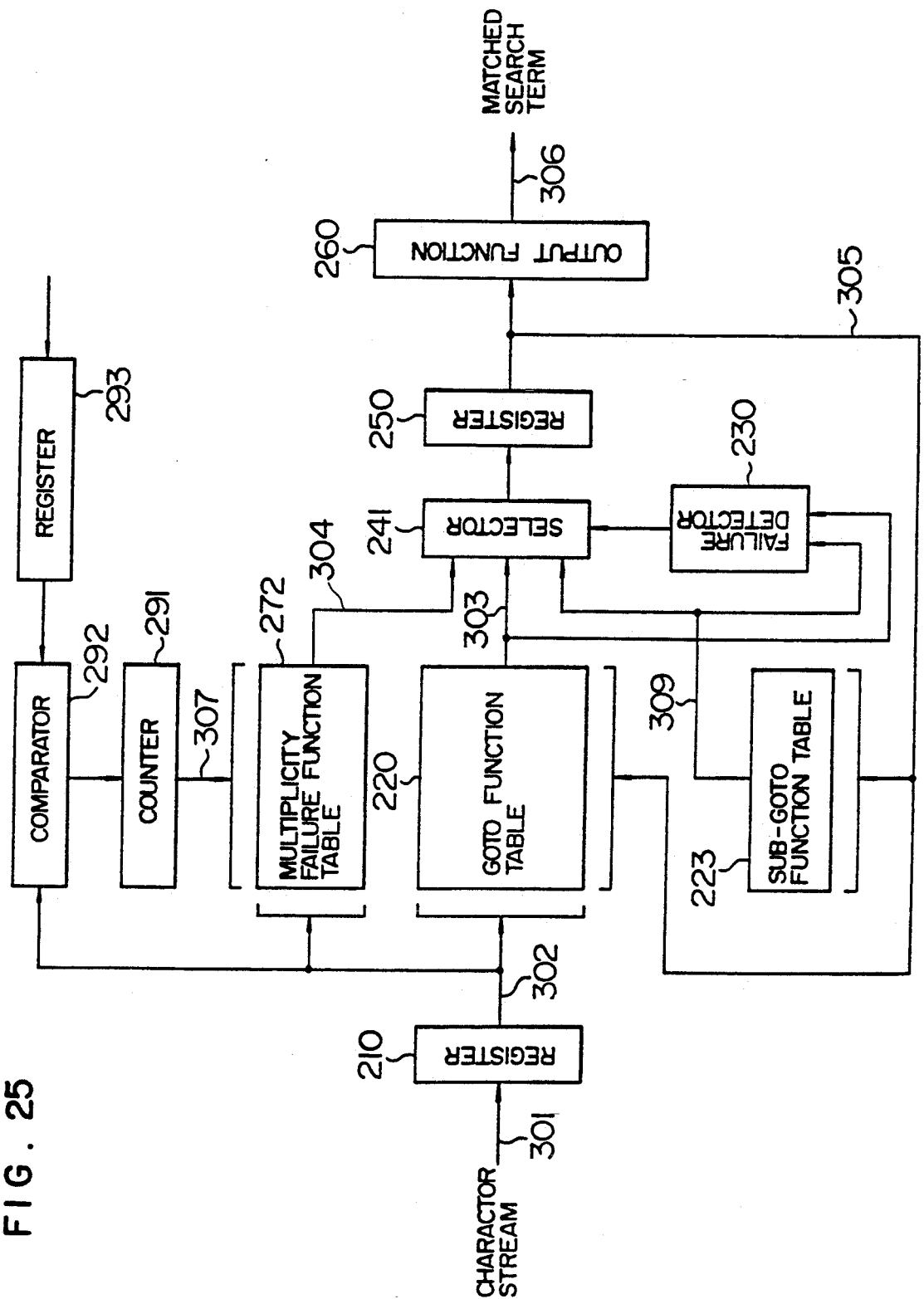

FIG. 25 shows a block diagram of a hardware system implementing the eighth embodiment in which the search processing is effected on a character stream constituted with a plurality of fields and on a description form for matching candidate character set as described above. In a goto function table 220, there is stored an FSA state transition table of FIG. 24 for searching a plurality of fields.

A multiplicity failure function table 272 is a table in which there are stored numbers of transit states (numbers of succeeding states to failure processing) to be used when an unmatching condition occurs in a collation between the character stream and an input character stream, namely, when a failure is detected. For each multiplicity failure function table 272, a plurality of preprocessing failure function tables are gathered depending of the processing objective field. These preprocessing failure function tables 272 can be changed over in response to a separator beforehand specified. A character code of the separator is stored in a register 293 in advance so as to be compared with an input character code 302 in a comparator 292. When a character code identical to the separator is inputted, a counter 292 (having one as an initial value) is incremented and a field number 307 is changed over. FIG. 27 shows the contents of the multiplicity failure function table in this situation The content of the field number 1 is the same as that of the first field in the initial state thereof, namely, the state 1 in the goto function table 220, whereas the content of the field number 2 is identical to that of the second field in the initial state thereof, namely, the state 2. In consequence, in a case a failure occurs during a search processing on the first field, the state transition takes place to the state 1; whereas in a case in which a failure takes place during a search processing on the second field, the state is changed to the state 2.

As described above, by adopting the multiplicity failure function table 272, the different states effected by failure can be specified for the respective fields and hence the FSA for the search operation on a document constituted with a plurality of fields can be simplified.

A sub-goto function table 223 is disposed to implement a function which removes all codes other than the specified codes from the objects of the search processing. That is, in a case where a character other than those described for the transit states of the goto function table 220, the sub-goto function table 223 is referenced to determine the subsequent transit state. FIG. 28 shows the contents of the sub-goto function table 223, where auxiliary state numbers are stored corresponding to the current state numbers 305. In this situation, when a character "e" or "n" not described for the transit state in the goto function table is inputted in the state 5, the state transition occurs again to the state 5 which is an output obtained from the sub-goto function table 223. That is, the error recognition characters are skipped so as to effect a search operation based on the correct character specified.

As described above, by adopting the sub-goto function table 223, the transitions associated with the input character codes other than those specified can be described by use of a simple FSA, which facilitates an application of the system to a search processing on the description form for matching candidate character set.

The outputs attained by referencing the goto 5 function table 220, the multiplicity failure function table 272, and the sub-goto function table 223 are selected depending on the detection result of the failure detector 230 so as to be used as the current state number 305, which is thereafter set as the reference state for the subsequent processing. That is, in a case, the next state number 303 referenced by use of the goto function table 220 is other than 0, the state number is selected as the number 305 of transit state; whereas if the next state number 303 is 0, based on the value of the auxiliary state number 309 referenced by use of the sub-goto function table 223, the auxiliary state number 309 or the number 304 of state effected by failure attained as the reference value from the multiplicity failure function table 272 is selected In a case where the auxiliary state number 309 is 0, the number 304 of state effected by failure is selected; otherwise, the auxiliary state number 309 is selected. As described above, the outputs from the three kinds of tables are alternatively selected for each collate processing of each character depending on the outputs therefrom, thereby accomplishing the search processing.

As described above, by using the multiplicity failure function table 272, an FSA for a search operation on a character stream constituted with a plurality of fields can be described in a simple fashion; in addition, by use of the sub-goto function table 223, an FSA for a search operation on a description form for matching candidate character set can be described in a relatively simple manner.

Figure 29:
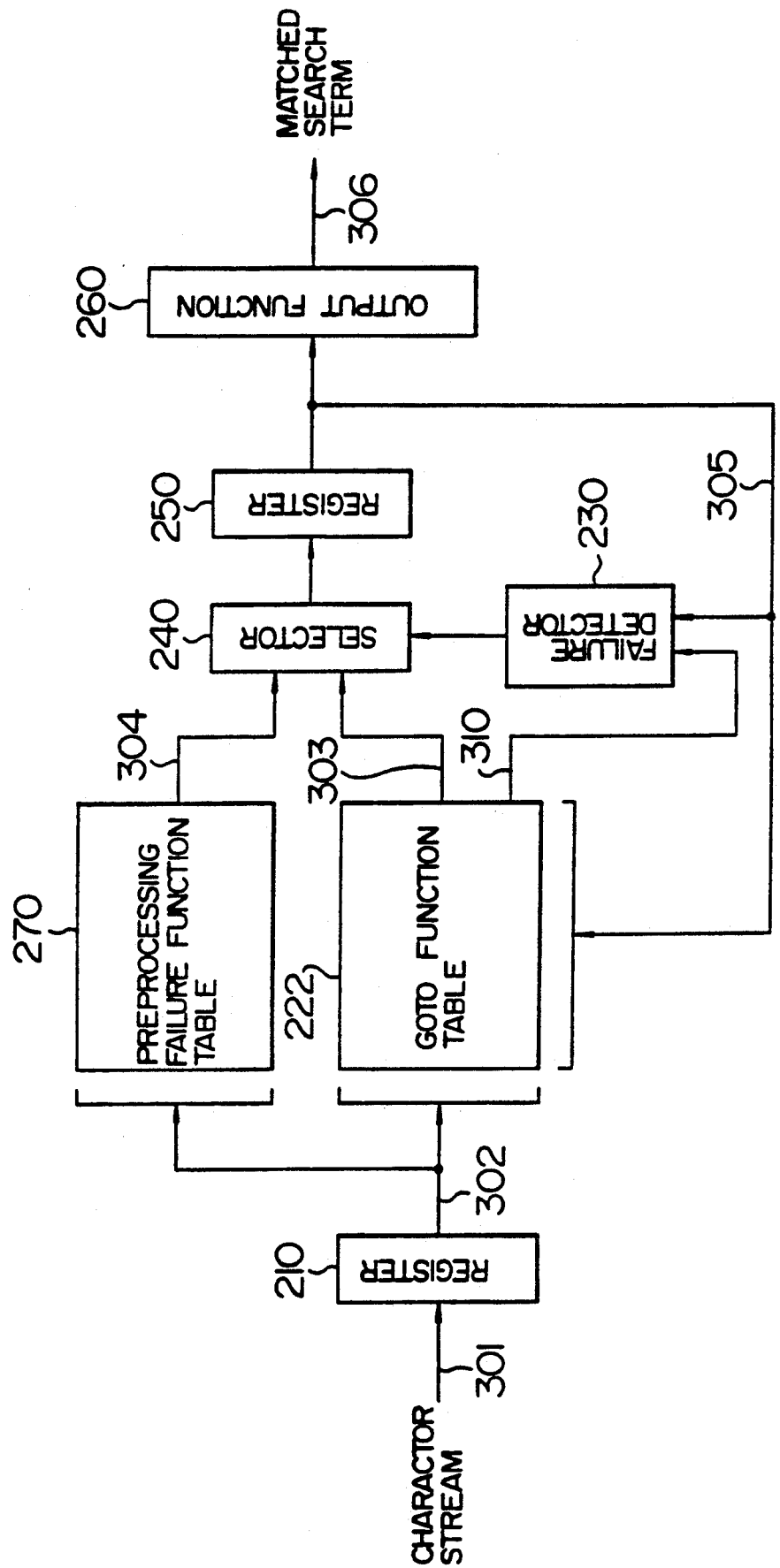

In the above embodiments, description has been given of a case where a random access memory (RAM) is used as the goto function table; however, a content-addressed memory (CAM) may also be employed therefor. FIG. 29 shows an embodiment in which a content-addressed memory (CAM) is adopted as the goto function table. This configuration is different from that of the method 6 of FIG. 20 in that there is added a detection signal 310 to the goto function table 222. FIG. 30 shows the contents of the goto function table 222 corresponding to those of the goto function table 220 of the method 6. In the goto function table 222, there is stored at an address a set of data including a current state number, a transition initiate character code for a transition therefrom, and a number of transit state associated therewith. When the current state number 305 and the character code 302 are inputted, if the goto function table 222 includes data matching therewith, the detection signal 310 is set to 1 and the corresponding transit state number 303 is delivered to the selector 240. If the pertinent state number and the character code are missing in the goto function table 222, the detection signal 310 is set to 0 and the transit state number 303 is not outputted. For example, in a case where the current state number 305 indicates the state 6, the detection signal 310 is set to 1 if the character code 302 is "X" or "Y"; otherwise, the detection signal 310 is set to 0. When the character code 302 is "X", the transit state number 305 is set to 3; whereas when the character code "Y", the transit state number 305 is set to 7. As described above, the state number associated with the transit state is sequentially read out from the goto function table 222 formed by use of the content-addressed memory (CAM), thereby continuously effecting the collate processing.

As described above, also when the content-addressed memory (CAM) is used, like in the case where the random access memory (RAM) is employed, the function of the goto function table can be implemented. In this situation, as can be clear from the comparison between FIG. 21 and FIG. 30, the goto function table can be constituted with a quite small capacity.

According to the present invention as described above, by disposing an upper limit of the utilization count of the failure function for a character, the generation time of FSA is reduced; furthermore, the number of characters processed in a unit of time can be fixed, thereby implementing a character stream search apparatus which can be easily controlled. In addition, at a maximum processing speed, the state transition processing for a character can be accomplished in a cycle. Moreover, since the FSA for a search of a character stream in a document constituted with a plurality of fields and in a description form for matching candidate character set can be described in a simple fashion, a character stream search apparatus for these documents can be easily implemented.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

We claim:

1. A character stream search apparatus using a finite state automation for determining whether or not a plurality of character streams functioning as search objects exist in a search character stream which undergoes a search operation and which comprises a plurality of characters expressed in codes, said apparatus comprising:

character input for inputting a search character from among a plurality of search characters which are to undergo a search operation and for storing and outputting said search character as a search which is to undergo the search operation;

goto function table store means for storing a goto function table so as to repeatedly effect a failure processing up to a maximum number of times corresponding to a predetermined count, said failure processing effecting, at a collation between the search character which is to undergo the search operation and a search object character code, a collation between the search character which is to undergo the search operation and the search object character code in a state predetermined for a current state, said goto function table including transition a state numbers of transition destinations related to current state numbers and said search object character codes;

separator means for outputting information indicating one of a plurality of fields based on a predetermined separator code;

multiplicity failure function table store means for storing a plurality of fields each having a plurality of state transition numbers to corresponding to states effected by an occurrence of a failure processing and for outputting a transition state number in response to said search character and said information output by said separator means;

sub-goto function table store means for storing a sub goto function table including auxiliary state numbers for use in eliminating unspecified character codes from said search object character code, said auxiliary state numbers corresponding to current state numbers and search object character codes;

failure detect means for detecting an unmatching condition at a collation between the search character and the search object character code based on a transition state number outputted from said goto function table store means, an auxiliary state number output from said sub-goto function table store means and a current state number and for causing a new input operation of said character input means to enter a wait state;

transition destination select means for receiving as inputs to said transition destination select means an output from said goto function table store means, an output from said sub-goto function table store means and an output from said multiplicity failure function table store means so as to select and to output one of said outputs depending on an output from said failure detect means;

read means for temporarily storing an output from said transition destination select means so as to output said output of said transition destination select means as said current state number and for reading out a transition state number from said goto function table store means and an auxiliary state number from said sub-goto function table store means based on said current state number and said search object character code; and character stream identify means for outputting, in a case where a state number outputted from said read means is a transition state number associated with a final character code of the search character stream, an identification number of the search character stream.

2. A character stream search apparatus using a finite state automaton for determining at a time whether of not a plurality of character streams functioning as search objects exist in a search character stream which undergoes a search operation and which comprises a plurality of characters expressed in codes, said apparatus comprising:

character input means for inputting a search character from among a plurality of search characters which are to undergo a search operation and for storing and outputting said search character as a search character which is to undergo the search operation;

goto function table store means for storing a goto function table so as to repeatedly effect a failure processing up to a maximum number of times corresponding to a predetermined count, said failure processing effecting, at a collation between the search character which is to undergo the search operation and a search object character code, a collation between the search character which is to undergo the search operation and the search object character code in a state predetermined for a current state, said goto function table including transition state numbers of transition destinations related to current state numbers and search object character codes;

character code detecting means for detecting a type of character code based on said search character and outputting an indication of the type of character code;

means for storing numbers of states effected by an occurrence of a failure in correspondence with types of character codes and for outputting a state number in response to the type of character code indicated by the character code detector;

failure detect means for detecting an unmatching condition at a collation between the search character and the search object character code based on a transition rate number outputted from said goto function table store means and a current state number and for causing a new input operation of said character input means to enter a wait state;

transition destination select means for receiving as inputs to said transition destination select means an output from said goto function table store means and an output from said means for storing numbers of states effected by an occurrence of a failure so as to select and to output one of said outputs depending on an output from said failure detect means;

read means for temporarily storing an output from said transition destination select means so as to output said output of said transition destination select means as a current state number and for reading out a transition state number from said goto function table store means based on said current state number and said search object character code; and character stream identify means for outputting, in a case where a stage number outputted from said read means is a transition state number associated with a final character code of the search character stream, an identification number of the search character stream.

3. A character stream search apparatus using a finite state automation for determining whether or not a plurality of character streams functioning as search objects exist in a search character stream which undergoes a search operation and which comprises a plurality of characters expressed in codes, said apparatus comprising:

character input means for inputting a search character from among a plurality of search characters which are to undergo a search operation and for storing and outputting said search character as a search character which is to undergo the search operation;

goto function table store means for storing a goto function table so as to repeatedly effect a failure processing up to a maximum number of times corresponding to a predetermined count, said failure processing effecting, at a collation between the search character which is to undergo the search operation and the search object character code in a state predetermined for a current state, said goto function table including transition state numbers of transition destinations related to current state numbers and search object character codes;

character code detecting means for detecting a type of character code based on said search character and outputting an indication of the type of character code;

preprocessing failure function table store means for storing a failure function table including numbers of states effected by an occurrence of a failure corresponding to types of character codes and search characters and outputting a state number in response to the type of character code indicated by said code detection means and said search character;

failure detect means for detecting an unmatching condition at a collation between the search character and the search object character code based on a transition rate number outputted from said goto function table store means and a current state number and for causing a new input operation of said character input means to enter a wait state;

transition destination select means for receiving as inputs to said transition destination select means an output from said goto function table store means and an output from said preprocessing failure function table store means so as to select and to output one of said outputs depending on an output from said failure detect;

read means for temporarily storing an output from said transition destination select means so as to output said output of said transition destination select means as a current state number and for reading out a transition state number from said goto function table store means based on said current state number and said search object character code; and character stream identify means for outputting, in a case where a stage number outputted from said read means is a transition state number associated with a final character code of the search character stream, an identification number of the search character stream.

4. A character stream search apparatus using a finite state automation for determining whether or not a plurality of character streams functioning as search objects exist in a search character stream which undergoes a search operation and which comprises a plurality of characters expressed in codes, said apparatus comprising:

character input means for inputting a search character from among a plurality of search characters which are to undergo a search operation and for storing and outputting said search character as a search character which is to undergo the search operation;

goto function table store means for storing a goto function table so as to repeatedly effect a failure processing up to a maximum number of times corresponding to a predetermined count, said failure processing effecting, at a collation between the search character which is to undergo the search operation and a search object character code, a collation between the search character which is to undergo the search operation and the search object character code in a state predetermined for a current state, said goto function table including transition state numbers of transition destinations related to current state numbers and search object character codes;

preprocessing failure function table store means for storing a failure function table including numbers of state effected by an occurrence of a failure corresponding to search characters and outputting a state number in response to said search character;

failure detect means for detecting an unmatching condition at a collation between the search character and the search object character code based on a transition rate number outputted from said goto function table store means and a current state number and for causing a new input operation of said character input means to enter a wait state;

transition destination select means for receiving as inputs to said transition destination select means an output from said goto function table store means and an output from said preprocessing failure function table store means so as to select and to output one of said outputs depending on an output from said failure detect means;

read means for temporarily storing an output from said transition destination select means so as to output said output of said transition destination select means as a current state number and for reading out a transition state number from said goto function table store means based on said current state number and said search object character code; and character stream identify means for outputting, in a case where a stage number outputted from said read means is a transition state number associated with a final character code of the search character stream, an identification number of the search character stream.

5. A character stream search apparatus using a finite state automation for determining whether or not a plurality of character streams functioning as search objects exist in a search character stream which undergoes a search operation and which comprises a plurality of characters expressed in codes, said apparatus comprising:

character input means for inputting a search character from among a plurality of search characters which are to undergo a search operation and for storing and outputting said search character as a search character which is to undergo the search operation;

goto function table store means for storing a goto function table so as to repeatedly effect a failure processing up to a maximum number of times corresponding to a predetermined count, said failure processing effecting, at a collation between the search character which is to undergo the search operation and a search object character code, a collation between the search character which is to undergo the search operation and the search object character code in a state predetermined for a current state, said goto function table including transition state numbers of transition destinations related to current state numbers and search object character codes;

failure detect means for detecting an unmatching condition at a collation between the search character and the search object character code based on a transition state number outputted from said goto function table store means and a current state number and for causing a new input operation of said character input means to enter a wait state;

read means for reading out a transition state number from said goto function table store means based on said current state number and said search object character code; and character stream identify means for outputting, in a case where a stage number outputted from said read means is a transition state number associated with a final character code of the search character stream, an identification number of the search character stream.

6. A character stream search apparatus using a finite state automation for determining whether or not a plurality of character streams functioning as search objects exist in a search character stream which undergoes a search operation and which comprises a plurality of characters expressed in codes, said apparatus comprising:

character input means for inputting a search character from among a plurality of search characters which are to undergo a search operation and for storing and outputting said character as a search character which is to undergo the search operation;

goto function table store means for storing a goto function table so as to repeatedly effect a failure processing up to a maximum number of times corresponding to a predetermined count, said failure processing effecting, at a collation between the search character which is to undergo the search operation and a search object character code, a collation between the search character which is to undergo the search operation and the search object character code in a state predetermined for a current state and performing a data matching function, said goto function table including transition state numbers of transition destinations related to current state numbers and search object character codes, said goto function table store means, in responses to a current state number and said search character object code, when a match is detected between data stored in said goto function table outputs a transition state number and sets a match indicator to a first state and when a match is not detected sets said match indicator to a second state preprocessing failure function table store means for storing a failure function table including numbers of state effected by an occurrence of a failure corresponding to search characters and outputting a state number in response to said search character;

failure detect means for detecting an unmatching condition at a collation between the search character and the search object character code based on a stage of said match indicator and said current state number and for causing a new a new input operation of said character input means to enter a wait state;

transition destination select means for receiving as inputs to said transition destination select means an output from said goto function table store means and an output from said preprocessing failure function table store means so as to select and to output one of said outputs depending on an output from said failure detect means;

read means for temporarily storing an output from said transition destination select means so as to output said output of said transition destination select as said current state number; and character stream identify means for outputting, in a case where a stage number outputted from said read means is a transition state number associated with a final character code of the search character stream, an identification number of the search character stream.

* * * * *